United States Patent [19]

Dames et al.

[11] Patent Number: 5,420,569

[45] Date of Patent: May 30, 1995

[54] REMOTELY READABLE DATA STORAGE DEVICES AND APPARATUS

[75] Inventors: Andrew N. Dames, Cambridge; Peter J. Hyde, Newmarket, both of United Kingdom

[73] Assignee: Scientific Generics Limited, Cambridge, United Kingdom

[21] Appl. No.: 75,582

[22] PCT Filed: Jan. 3, 1992

[86] PCT No.: PCT/GB92/00014

§ 371 Date: Jun. 15, 1993

§ 102(e) Date: Jun. 15, 1993

[87] PCT Pub. No.: WO92/12402

PCT Pub. Date: Jul. 23, 1992

[30] Foreign Application Priority Data

Jan. 4, 1991 [GB] United Kingdom ............... 9100172
Feb. 5, 1991 [GB] United Kingdom ............... 9102475
May 8, 1991 [GB] United Kingdom ............... 9109897
Aug. 9, 1991 [GB] United Kingdom ............... 9117310
Sep. 2, 1991 [GB] United Kingdom ............... 9118722
Oct. 14, 1991 [GB] United Kingdom ............... 9121779

[51] Int. Cl.$^6$ ............................................. G08B 13/14
[52] U.S. Cl. ................................... 340/572; 342/551
[58] Field of Search ........... 340/572, 551, 514, 507, 340/870.02, 870.22, 870.03; 324/209, 207.13, 207.22, 157; 347/572, 870.22, 870.02

[56] References Cited

U.S. PATENT DOCUMENTS

| | | | |
|---|---|---|---|
| Re. 26,774 | 1/1970 | Tellerman | 73/386 |
| 1,967,100 | 7/1934 | Pratt | 340/870.2 |
| 3,747,086 | 7/1973 | Peterson | 340/572 |
| 4,005,396 | 1/1977 | Fujiwara et al. | 340/870.22 |
| 4,037,219 | 7/1977 | Lewis | 340/870.22 |
| 4,071,818 | 1/1978 | Krisst | 324/207.13 |
| 4,510,489 | 4/1985 | Anderson, III et al. | 340/572 |
| 4,510,490 | 4/1985 | Anderson, III et al. | 340/572 |
| 4,647,917 | 3/1987 | Anderson, III et al. | 340/572 |
| 4,746,908 | 5/1988 | Montean | 340/572 |
| 4,928,089 | 5/1990 | Gasiunas et al. | 340/870.3 |
| 4,994,799 | 2/1991 | Levigion | 340/870.3 |
| 5,010,320 | 4/1991 | Cordery | 340/572 |
| 5,017,907 | 5/1991 | Cordery et al. | 340/572 |

FOREIGN PATENT DOCUMENTS 2261575 10/1990 Japan .

Primary Examiner—John K. Peng
Assistant Examiner—Benjamin C. Lee
Attorney, Agent, or Firm—Nixon & Vanderhye

[57] ABSTRACT

A magnetostrictive element, which may be of rectangular shape, is positioned next to a hard magnetic biasing element field with patterns recorded therein which bias the magnetostrictive element to resonate at selected frequencies, particularly harmonics of the fundamental frequency, in response to an alternating interrogating magnetic field at the same frequencies. Data may thus be encoded by selecting the frequencies at which the element will resonate. In addition to resonance at different harmonics, resonance in different modes, particularly longitudinal, transverse or flexural modes may be produced. The device may be applied to article identity systems, such as security systems but also has many other applications.

39 Claims, 18 Drawing Sheets

4TH HARMONIC: 1 BIT OF DATA

5TH HARMONIC: 1 BIT OF DATA

8TH HARMONIC: 1 BIT OF DATA

4TH, 5TH AND 8TH HARMONIC: 3 BITS OF DATA

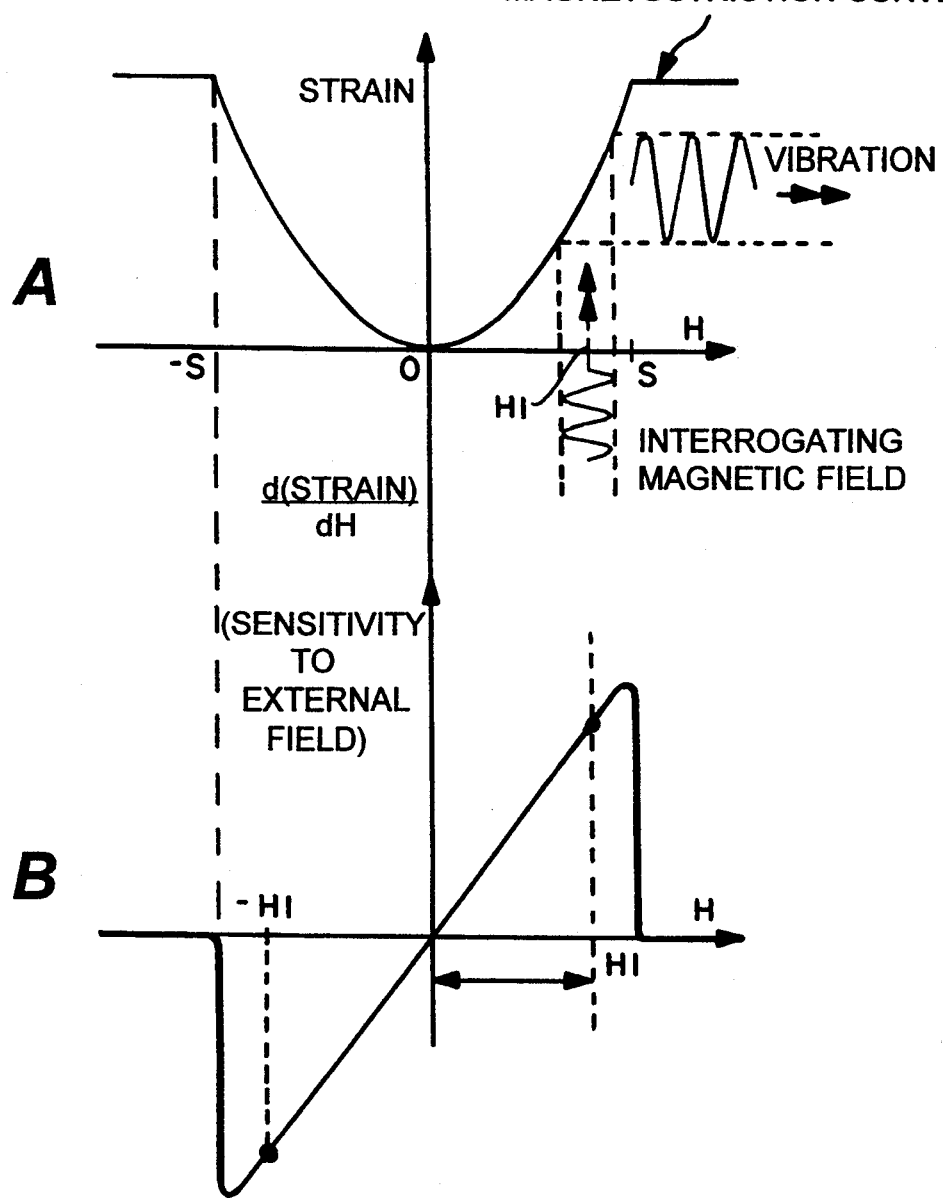

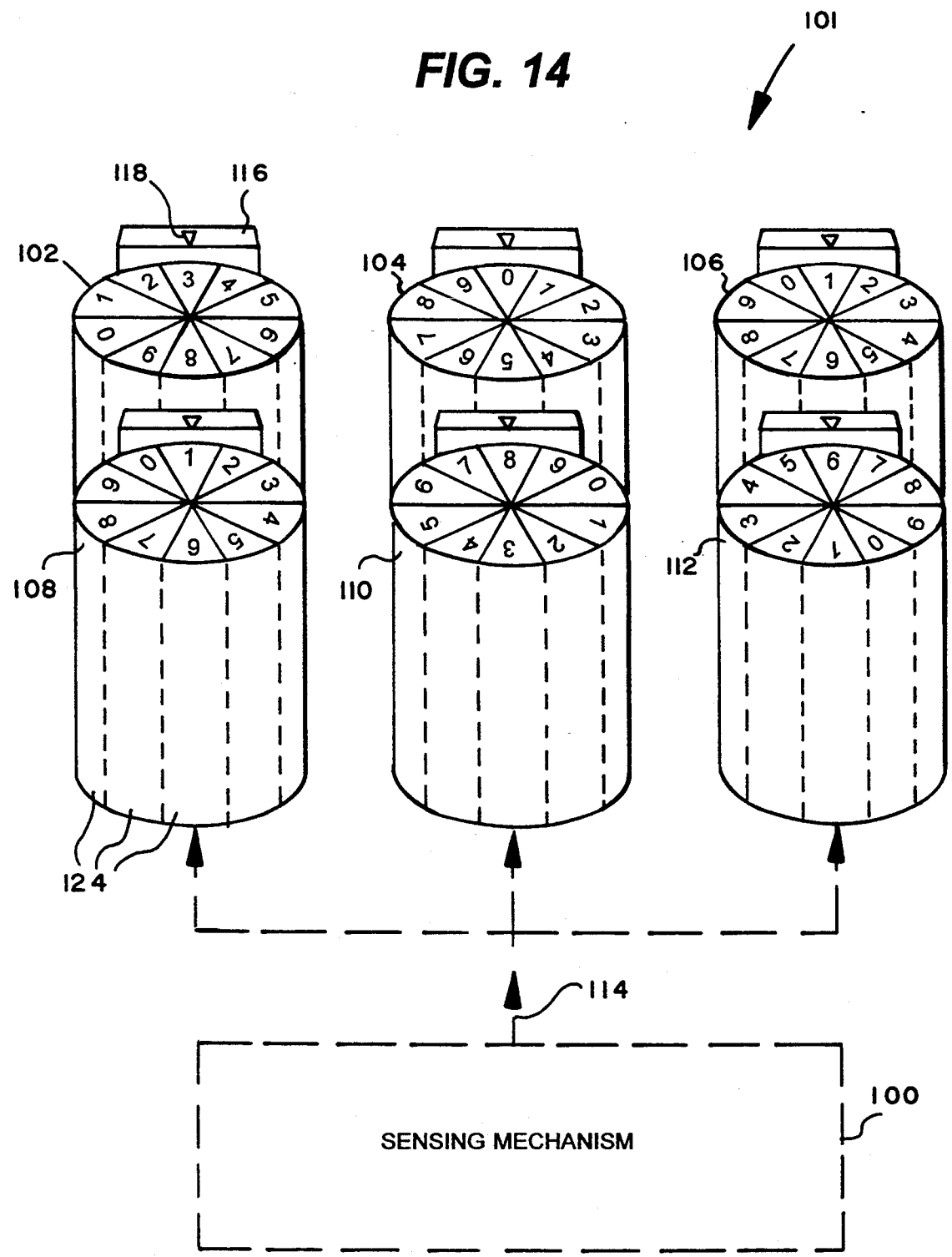

FIG. 26
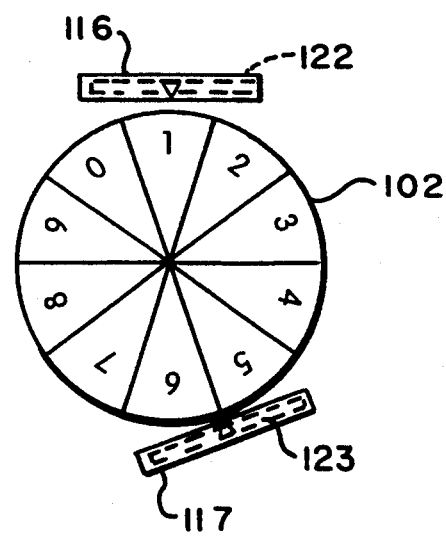
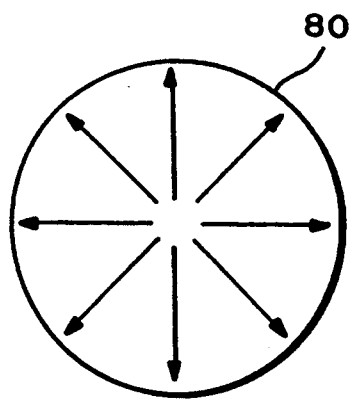
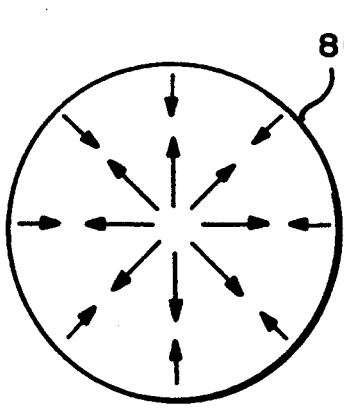
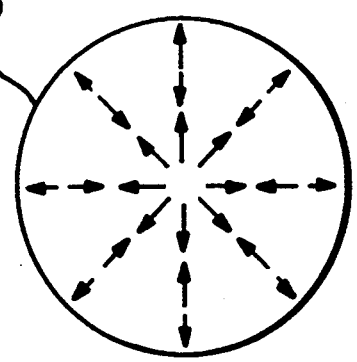
FIG. 27A     FIG. 27B     FIG. 27C

FIG. 35
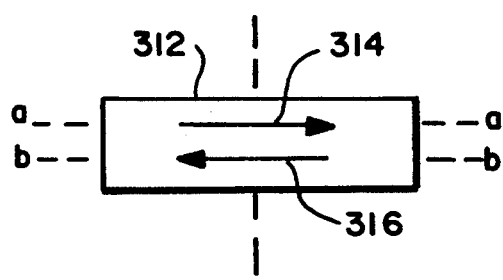
FIG. 37
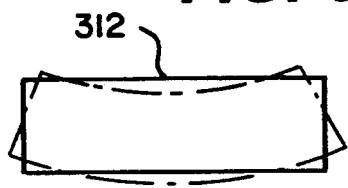
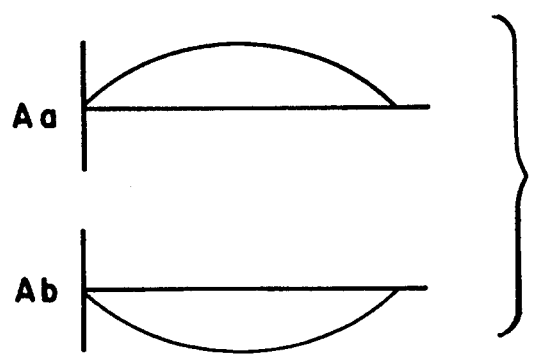
FIG. 36
FIG. 38
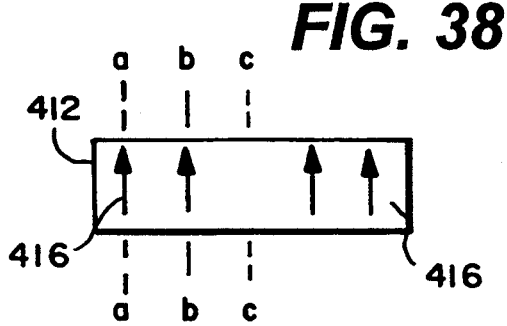
FIG. 40
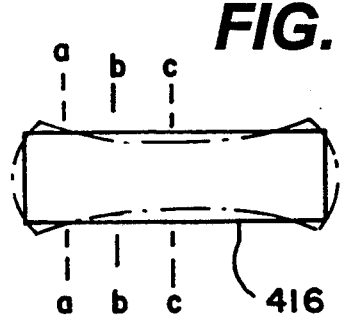
FIG. 39A
FIG. 39B
FIG. 39C

REMOTELY READABLE DATA STORAGE DEVICES AND APPARATUS

RELATED APPLICATIONS

This application is related to our copending commonly assigned U.S. patent application Ser. No. 08/075,583, filed Jun. 15, 1993.

BACKGROUND OF THE INVENTION

1. Field of the Invention

This invention relates to remotely readable data storage devices and apparatus and particularly concerns such devices and apparatus which may be interrogated by an externally applied field, especially an alternating magnetic field.

2. Related Art

U.S. Pat. No. 4,510,490 (Anderson III et al) discloses a data storage device in the form of a tag for attachment to an article for identification purposes. The tag comprises a plurality of strips of magnetostrictive material which are of differing lengths to each other and accordingly have different natural i.e. fundamental frequencies. These strips are mounted in a casing sufficiently loosely that they are free to vibrate. The casing contains or includes a strip of hard magnetic material parallel to the magnetostrictive strips and magnetized so as to apply a biasing field thereto. The magnetostrictive strips are biased (stressed) by the field such that if an external alternating magnetic field of the natural frequency of any one of the strips is applied, that strip will resonate mechanically to produce a detectable alternating field at the natural frequency of the strip. Differing tags are distinguished from each other by different combinations of lengths of the magnetostrictive strips so that different tags will produce regenerated magnetic fields having different combinations of frequencies. Interrogation of a tag is performed by sweeping or stepping the interrogating magnetic field through the range of the natural frequencies of the strips or generating an alternating magnetic field as a burst containing all of those frequencies simultaneously, And detecting any regenerated fields. An application of this device to an article control system, such as for controlling luggage at airports, for example, is disclosed in U.S. Pat. No. 4,647,917 (Anderson III et al).

The above described proposals suffer from a number of disadvantages. Firstly, since each tag must contain a number of magnetostrictive strips equal to the number of "bits" of information to be stored, the tags are relatively expensive particularly if a large number of different tags are to be uniquely identifiable. Secondly, since the identity of a tag is defined by the lengths of the strips of magnetostrictive material incorporated in it, such identity has to be determined at the time of manufacture. This is extremely inconvenient and adds significantly to manufacturing cost.

BRIEF SUMMARY OF THE INVENTION

An object of one aspect of the invention, therefore, is to overcome these difficulties. A further object of the invention is to provide a remotely readable data storage system or apparatus having much wider application than that disclosed in the above mentioned U.S. patents.

In one aspect, the invention provides a data storage device or apparatus having a magnetostrictive member and means for applying thereto a biasing magnetic field pattern which is such that the magnetostrictive member will resonate at a predetermined frequency greater than its natural frequency in response to an applied interrogating field at said predetermined frequency. In preferred embodiments, the biasing field pattern is such that a given single strip will resonate at two or more predetermined frequencies, one or more of which is greater than its natural frequency, in response application of interrogating fields of said predetermined frequencies.

An alternative aspect of the invention concerns apparatus for remotely reading indicating devices, such as gas or electricity meters. An embodiment of this aspect of the invention includes a movable indicating member, such as a rotary dial, and magnetostrictive means associated therewith and arranged to resonate, in response to an applied interrogating field, at different frequencies dependent upon the position of the indicating member. Such apparatus has the advantage that it is passive in the sense that a power supply at the meter or other indicating device is not needed for powering the remotely readable means. Further, such means can be easily incorporated in a meter without modifying the sensing arrangement and without interfering with the visibility of the display, if provided.

In an alternative embodiment of this aspect of the invention, a remotely readable indicator comprises magnetostrictive means, means for producing a magnetic field for biasing said magnetostrictive means and means for varying the relationship between the magnetostrictive means and the biasing field and/or varying the bias field as a function of a variable or quantity to be measured or indicated so that said magnetostrictive means is responsive to interrogating alternating fields of different frequencies dependent upon the value of said variable or quantity.

BRIEF SUMMARY OF THE DRAWINGS

The invention is described further, by way of example, with reference to the accompanying drawings in which:

FIG. 13 shows graphically characteristics of a magnetostrictive material which may be used in FIGS. 1 and 2;

FIG. 14 diagrammatically illustrates a remotely readable meter, such as a gas meter, comprising six dials, according to an embodiment of the invention;

FIG. 26 illustrates a further embodiment, in which increased accuracy may be achieved;

FIGS. 27A-27C illustrate a circular magnetostrictive resonant element which may be employed in alternative forms of the invention;

FIGS. 35 to 40 are diagrams illustrating the creation of different modes of vibration in the magnetostrictive element.

DETAILED DESCRIPTION OF EXEMPLARY EMBODIMENTS

Identification Tags or the like

Figure 1:
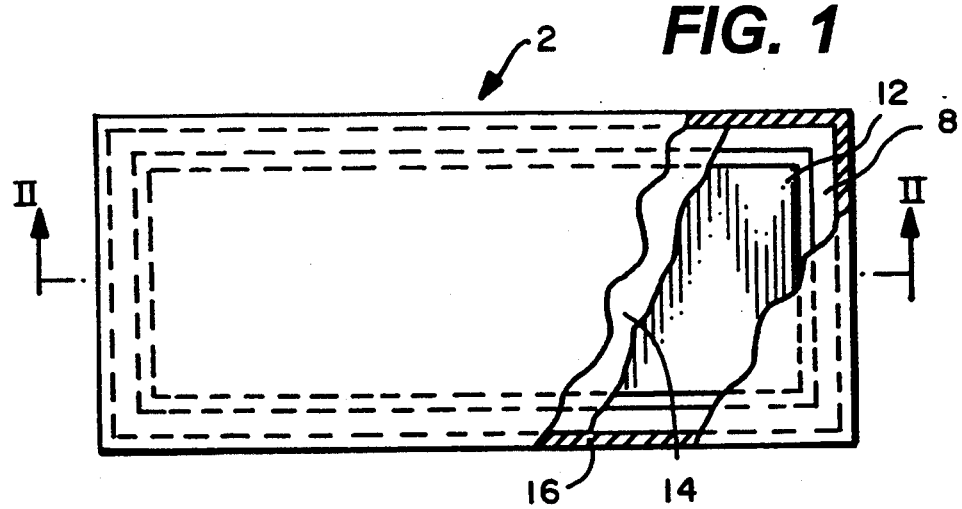
FIG. 1 is a plan view, partly cut away, of a data storage device in the form of a tag, according to an embodiment of the invention.
Figure 2:
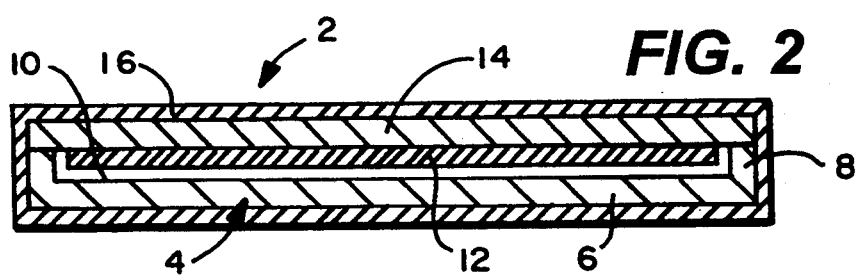
FIG. 2 is a section on the line II—II if FIG. 1.

The data storage device shown in FIGS. 1 and 2 is in the form of a tag 2 comprising a rectangular tray 4 having a bottom 6, and side and end walls 8 defining a cavity 10 in which a magnetostrictive element 12, in the form of a strip of magnetostrictive material, is disposed. The cavity 10 is closed by a rectangular plate 14 of hard magnetic material which is magnetized in use to act as a magnetic biasing element for the magnetostrictive strip 12. The plate 14 is held in place on the tray 4 by an envelope 16 tightly surrounding and/or adhered to the tray 4 and plate 14.

The length and width of the magnetostrictive element 12 are slightly less than the length and width of the cavity 10 and the thickness of the element 12 is less than the depth of the cavity 10. In this way, the magnetostrictive 12 is free to vibrate mechanically within the cavity 10 but is free to move only slightly laterally and longitudinally in the cavity 10. The tray 4 and envelope 16 are made of materials transparent to magnetic fields. For example, the tray 4 may be made of a relatively rigid synthetic plastics material such as that sold under the trade mark "DELRIN" and the envelope 16 may be made of thin, flexible synthetic plastics material or may, for example, comprise adhesive tape. Known magnetostrictive materials may be used for the element 12. Examples are amorphous, spin-melt ribbon such as sold under the trade mark "METGLAS 2605" or grain-oriented silicon transformer steel. The material chosen preferably has a high magnetic permeability with a high magnetostrictive coupling. Plate 14 may be made of any of a variety of hard magnetic materials. Examples include magnetic stainless steel, nickel, ferrite or mild steel. Alternatively, the plate 14 may comprise a non-magnetic substrate having a magnetic coating thereon, such as slurry-formed ferrite as used in magnetic tapes and magnetic discs. The properties required for the biasing element 14 are that it should be capable of being magnetized in selected magnetic patterns and should retain those patterns substantially permanently or at least for periods long enough for the particular application of the invention.

As is known from the above mentioned US patents, if the biasing element 14 were magnetized in the same way as a simple bar magnet, i.e a north pole at one end and a south pole at the other, the magnetostrictive element 12 would be stressed by the resulting magnetic field in such, a way that if the tag 2 were subjected to an external interrogating alternating magnetic field at a frequency equal to the natural frequency of the element 12, that element would mechanically vibrate and produce a detectable regenerated alternating magnetic field having the same frequency. In accordance with a preferred aspect of the present invention, however, different patterns of magnetisation are formed in the biasing element 14 so that the magnetostrictive element 12 will respond to and mechanically vibrate at frequencies which are harmonics of the natural or fundamental frequency.

Figure 3:
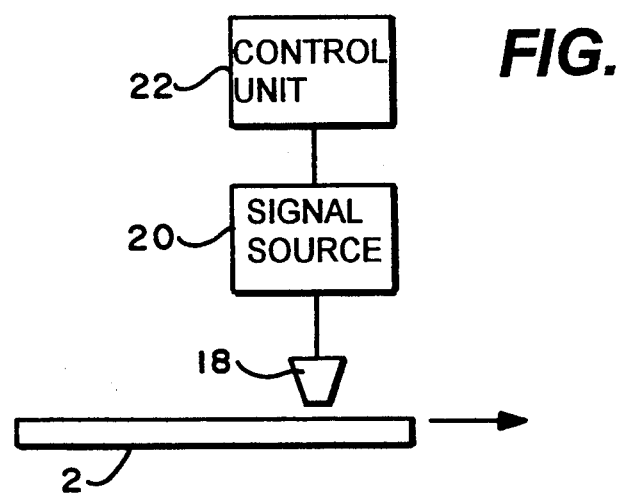
FIG. 3 diagrammatically illustrates a process for storing data on, or "programming", the tag of FIGS. 1 and 2.
Figure 4:
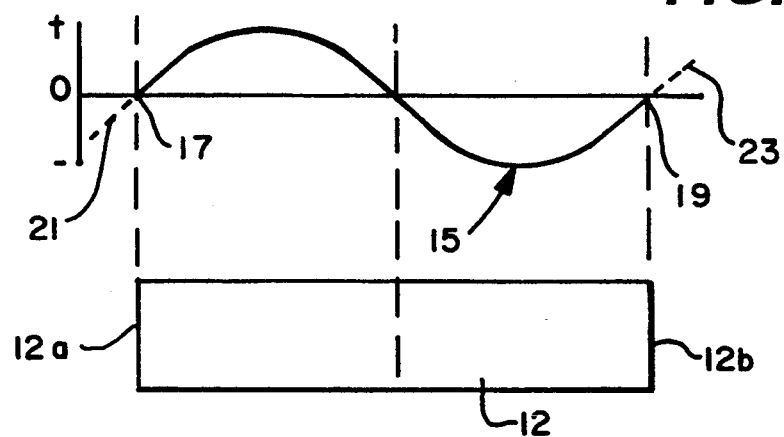
FIG. 4 shows an example of a signal waveform which may be generated in the process illustrated in FIG. 3.

As shown in FIG. 3, a required pattern of magnetisation may be recorded in the biasing element 14 by transporting the tag 2 past but in close proximity to a magnetic recording head 18 of conventional type, as shown by the arrow. As the tag 2 is transported past the recording head 18, a signal generator 20, controlled by a control unit 22, energizes the recording head 18 with a signal whose waveform is selected to produce the required magnetic pattern in the biasing element 14. FIG. 4 illustrates an example of a suitable waveform for storing a magnetic pattern in the element 14 which will bias the magnetostrictive element 12 in such a way that it will resonate at a frequency of twice its natural or fundamental frequency in response to an applied interrogating alternating field also having a frequency of twice the natural or fundamental frequency of the strip 12. As can be seen in FIG. 4, the waveform is a sine wave 15 whose frequency and phase relative to the movement of the tag 2 past the recording head 18 are chosen so that a single cycle of the sine wave as recorded in element 14 coincides with the length of the magnetostrictive element 12 with the zero crossing points 17 and 19 of the sine wave substantially coincident with the ends 12a and 12b of the element 12. In the recording process, the signal source 20 is turned on prior to arrival of the tag beneath recording head 18 and is turned off after the tag has passed the recording head 18 so as to avoid the generation of transients and the recording thereof in the element 14, which may arise if the signal source 20 were turned on and off at the zero crossing points 17 and 19. This process is illustrated by dotted line portions 21 and 23 of the sine wave 15 in FIG. 4.

Figure 5:
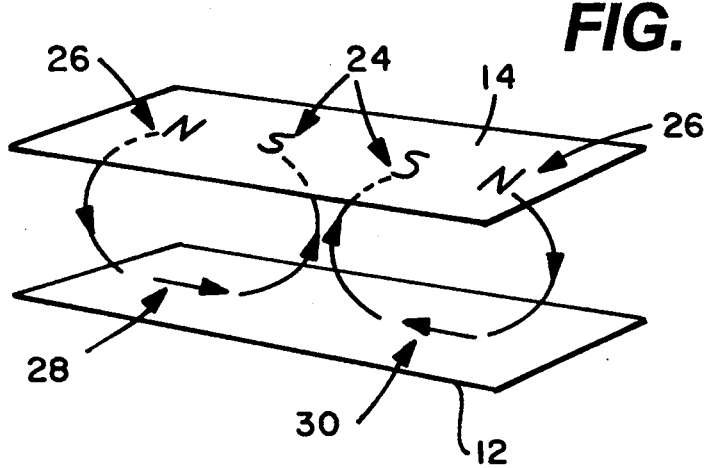
FIG. 5 illustrates the magnetic field pattern provided in the tag of FIGS. 1 and 2 when the signal waveform of FIG. 4 is used in the process of FIG. 3.

As can be seen in FIG. 5, the resulting magnetic pattern in element 14 comprises south pole regions 24 near to the center of the strip and north pole regions 26 towards the ends of the strip 14. Arrows 28 and 30 in FIG. 5 indicate the magnetic lines of force arising from the above described magnetic pattern recorded in element 14 and, as shown, by the direction of these arrows, the resulting field with which the magnetostrictive element 12 is biased is directed to the right in the left hand portion of the strip 12 and to the left in the right hand portion. Accordingly, when the tag 2 is subjected to an interrogating alternating magnetic field of twice the natural frequency of the strip 12, the two halves thereof will resonate in phase opposition to each other at a frequency equal to twice the natural frequency. A detectable regenerated field at twice the natural frequency is thus produced.

Figure 6:
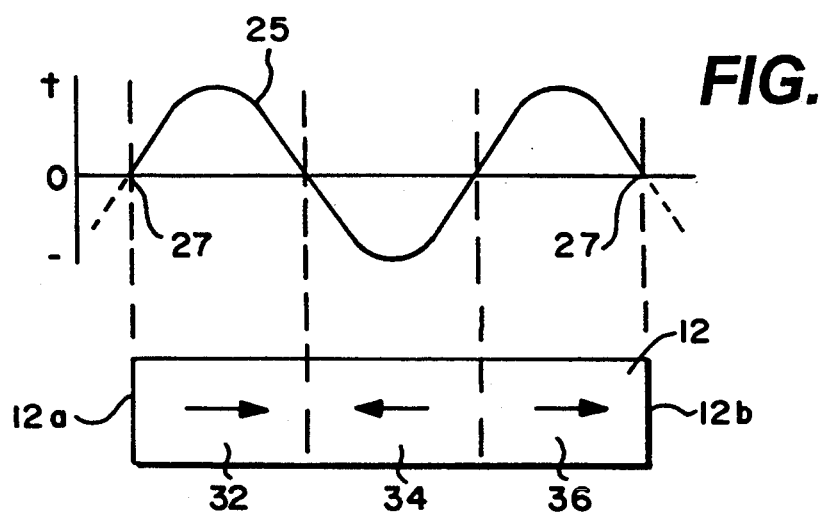
FIG. 6 to 9 show further waveforms which may be employed, for producing magnetic field patterns which will cause the tag to respond to interrogating fields of differing frequencies.

If it were desired to cause the magnetostrictive element 12 to resonate at a frequency of three times its natural frequency in response to an applied interrogating field of corresponding frequency, the waveform shown in FIG. 6 may be used when performing the programming illustrated in FIG. 3. As shown in FIG. 6, the sine signal 25 applied to the recording head 18 as the tag 2 is moved therepast is at a frequency and phase relative to the movement of the tag 2 such that one and a half cycles of the sine wave applied to recording head 18 correspond substantially to the length of the strip 12 with zero crossing points 27 substantially coincident with the ends of the strip 12. As in the embodiment of FIG. 4, the sine signal 25 is turned on prior to arrival of the tag beneath the recording head 18 and off subsequent to the departure of the tag from beneath the recording head 18 for the same reasons.

The magnetic field produced in the strip 12 by the element 14 with the signal 25 recorded thereon comprises three portions 32, 34 and 36. The portion 32 in the left hand one third of the element 12 is directed to the right, the portion 34 in the center one third of the element 12 is directed to the left and the portion 36 in the right hand one third of the element 12 is directed to the right. Such strip will, accordingly, resonate at three times its natural frequency in response to an applied alternating magnetic field having a frequency three times the natural frequency of, the strip. Such resonance, which is a mechanical vibration, will produce a detectable regenerated magnetic field at three times the natural frequency.

Figure 7:
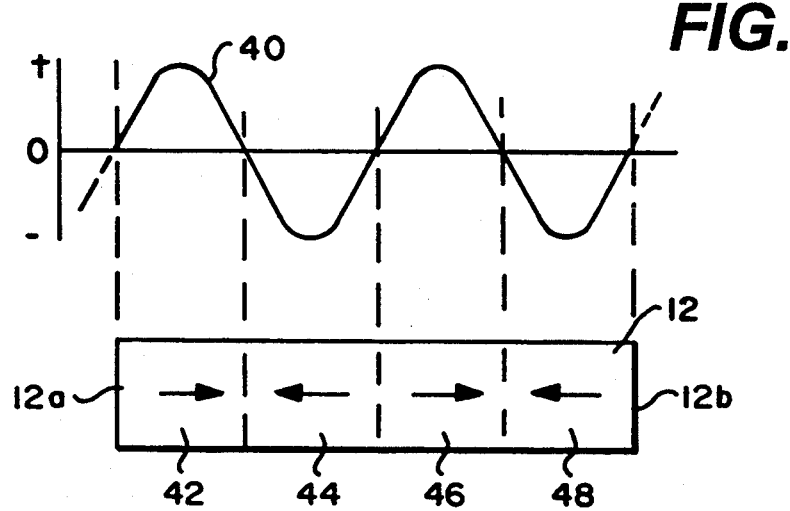

FIG. 7, which is similar to FIG. 6, shows at 40 a sine wave which may be applied to the recording head 18 to produce a tag which will resonate at four times the natural frequency of the magnetostrictive element 12. The frequency of the signal applied to the recording head 18 is such that two full cycles of sine wave are recorded in element 14 with zero crossings arranged as previously described and the recording of transients being avoided as previously described. As shown at 42, 44, 46 and 48, the resulting biasing magnetic field pattern to which the strip 12 is subjected comprises four zones in which the direction of the field reverses form one zone to the next. Thus, the strip will resonate mechanically in response to an applied interrogating magnetic field of four times the natural frequency of the strip, the frequency of resonation being four times the natural frequency of the strip. Again, this produces a detectable regenerated field at four times the natural frequency of the strip.

Figure 8:
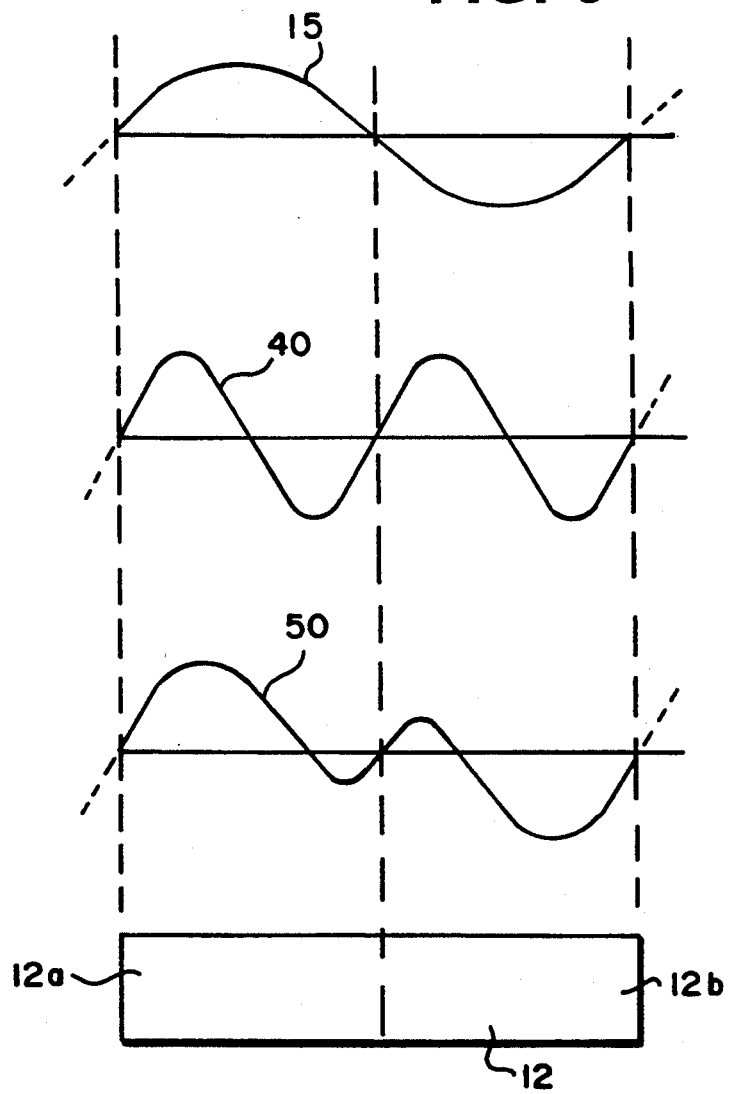

The tag can be programmed so that the magnetostrictive element 12 will resonate at higher harmonics by correspondingly adjusting the signal recorded by the recording head 18. Further, although up to this point, description has been given of how to encode the tag so that the magnetostrictive element 12 will resonate at only a single frequency which is a harmonic of its fundamental frequency, it is possible and preferred within the scope of the invention to program the tag so that the magnetostrictive element 12 will be capable of resonating in response to each of a number of interrogating frequencies. Such frequencies may comprise the fundamental and one or more harmonics or the fundamental may be omitted, as desired. This is simply achieved by recording a magnetic pattern on the strip 14 which represents the superposition of the magnetic patterns necessary for each of the individual frequencies required. An example of this is shown in FIG. 8 which shows at 50 a waveform for recording on the strip 14 to cause resonance of the magnetostrictive element 12 at both twice and four times the fundamental frequency. The waveform 50 is derived by simply adding waveforms 15 and 40 which are respectively the same as the waveforms shown in FIGS. 4 and 7.

Although FIG. 8 illustrates the encoding of a tag to resonate at two harmonics, it is possible to encode tags in accordance with the invention to resonate at more than two harmonics simply by adding together the waveforms for the required harmonics or to resonate at its natural frequency plus one or more harmonics by adding together the waveform required for the fundamental (which would be half a cycle of sine wave with the zero crossing points coincident with the ends 12a, 12b of the strip 12) and that required for each desired harmonic. The amplitude of the resonance produced at different frequencies is a function, inter alia, of the amplitude of the signal recorded on the tag to produce the resonance. Accordingly, the recorded signals for producing different resonances may have different amplitudes to compensate for other factors in the system such as the fact that the amplitude of the resonance at higher harmonics tends naturally to be less than that at lower harmonics. Examples of other factors which may be compensated for in this way are noise, receiver sensitivity at different frequencies, differing interrogation field strengths at different frequencies etc.

Figure 9:
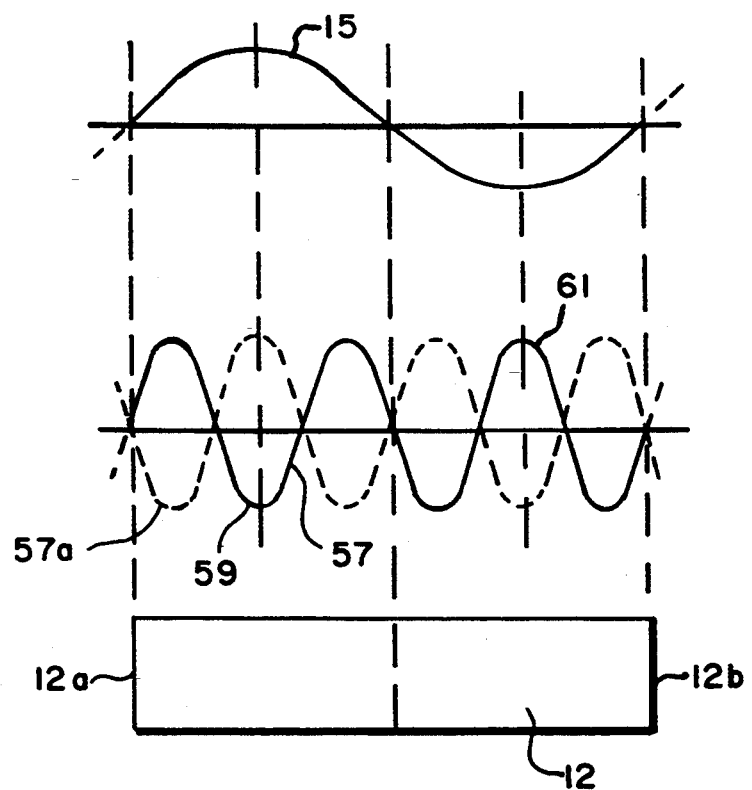

When adding together waveforms to obtain resonance at a number of different frequencies, the amplitude and phase relationships between the signals to be added should be selected to avoid saturation of the magnetostrictive element 12. An example of how this may be achieved is shown in FIG. 9 in which waveform 15 (which is the same as previously described) is to be added to a waveform 57 which, as will be appreciated from consideration of FIG. 9, will provide resonance at six times the natural frequency of the strip 12. The preferred phase of waveform 57 is shown in full lines in FIG. 9 and it is seen that the peaks 59 and 61 which are coincident with the peaks of waveform 15 are of opposite sign to the corresponding peaks in waveform 15, thus avoiding addition of the peaks of the two waves. A broken line wave shown at 57a in FIG. 9 is the inversion of waveform 57 and its phase is thus such that its peaks would add to the peaks of waveform 15. In those circumstances, the amplitudes of the two waves would have to be kept to a lower level than where waveform 57 is used if saturation of the magnetostrictive strip 12 is to be avoided.

Figure 10:
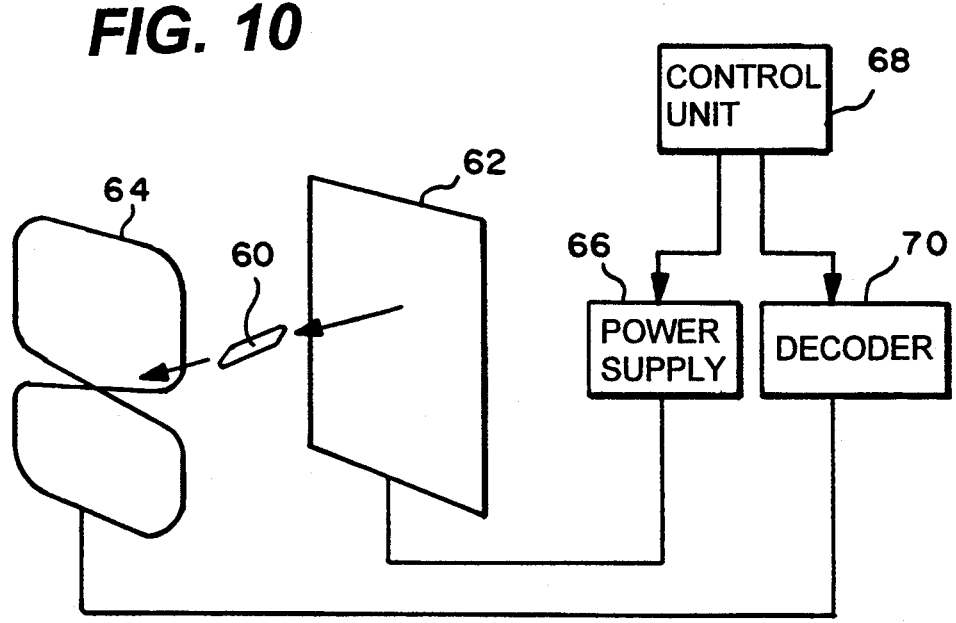
FIG. 10 diagrammatically illustrates an interrogation system which may be used with the tag of FIGS. 1 and 2.

A data storage device made as described above with reference to FIGS. 1 to 9 may be employed in a system as shown in FIG. 10 in which the device is incorporated in a card 60 which, for interrogation purposes, passes between transmitting and receiving coils 62 and 64. The transmitting coil is driven by a power supply 66 controlled by a control unit 68 to cause the coil 62 to produce an alternating interrogating magnetic field which is swept through all of the selected frequencies at which the magnetostrictive elements of the tags or cards used in the system may be programmed to resonate. In the absence of a tag, the output of receiving coil 64 is substantially null in view of the figure-of-eight configuration thereof as shown in the drawing. However, when a particular card or tag 60 is placed between the coils 62 and 64 and the above described alternating field produced, the resulting resonance of the magnetostrictive element 12 at the frequencies for which it is programmed will be detected by coil 64 and the resulting signals decoded in decoder 70. There will normally be no nulling of the signal regenerated by the tag since it is highly unlikely that the tag will be symmetrically disposed with respect to the figure-of-eight configuration of the receiving coil 64.

Figure 11A:
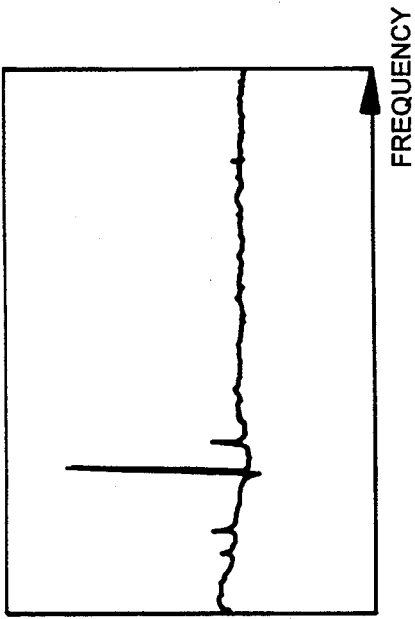
FIGS. 11A–11D show four oscillograph traces obtained experimentally using a tag as described with reference to the previous figures.
Figure 11B:
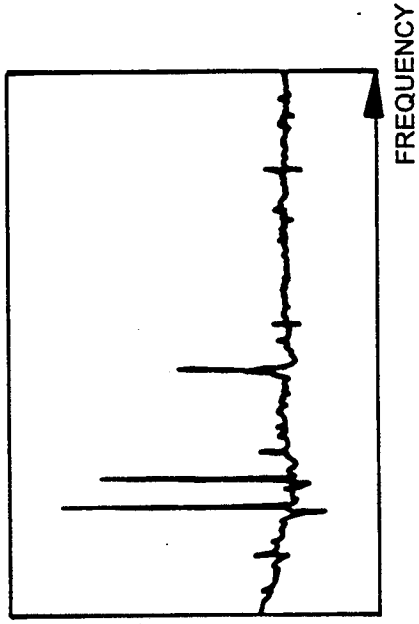
Figure 11C:
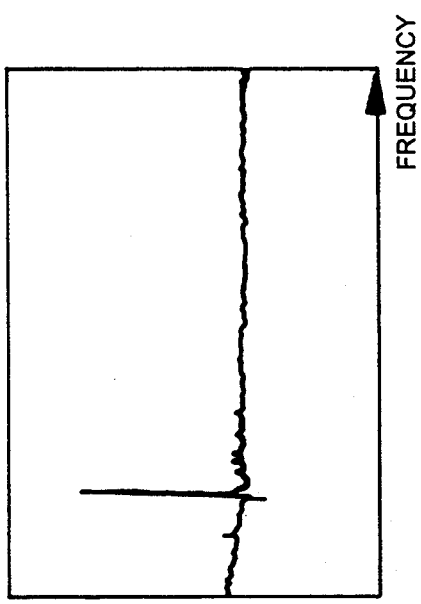
Figure 11D:
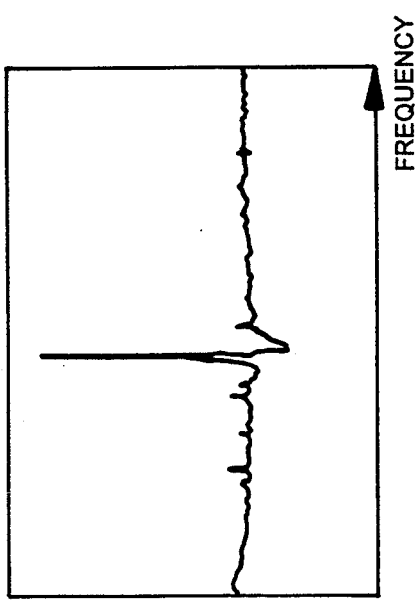

The traces shown in FIGS. 11A–11D show responses which have been obtained with a system such as that shown in FIG. 10 experimentally. Thus, waveform FIG. 11A shows the response obtained to a tag programmed to resonate at four times the natural frequency of the strip 12 when the frequency of the interrogating field is swept. The waveform in FIG. 11B illustrates the response of a tag programmed to produce resonance at five times the natural frequency and the waveform in FIG. 11C illustrates the response of a tag programmed to resonate at eight times the natural frequency. The waveform in 11D shows the response of a tag programmed to resonate at each of the fourth, fifth and eighth harmonics, i.e. four times, five times and eight times the natural frequency of the strip 12. As can be seen from the waveforms of FIGS. 11A–11D, a peak in the amplitude of the output from the detecting coil 64 arises when the frequency of the applied interrogating field passes through the frequency at which the strip is programmed to resonate.

Figure 12:
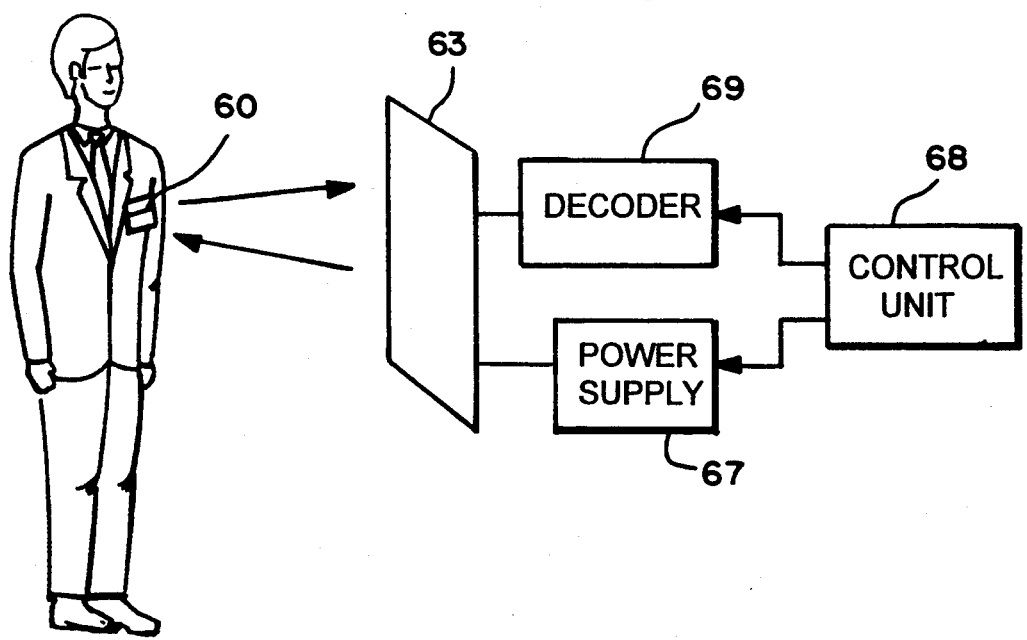
FIG. 12 diagrammatically illustrates another form of interrogation system which may be used with the tag of FIGS. 1 and 2.

FIG. 12 shows an alternative arrangement to that shown in FIG. 10 in which a single coil 63 is used as both the transmitting and receiving coil. FIG. 12 shows the card 60 being used for purposes of identification of the person carrying the card. In this embodiment, the interrogating field is applied in bursts and detection is performed in a period of silence following each burst. During such period, the resonant strips in the tags will "ring" producing the regenerated detectable field frequency at frequencies to which they are encoded to respond.

FIG. 13 comprises two curves illustrating the way in which the sensitivity of the device to the applied interrogating field varies as a function of the strength of the biasing field produced in the strip 12 by the magnetisation of the biasing element 14. In FIG. 13, curve A is a plot of the strain produced in a magnetostrictive element against field H applied to the element. Thus, at the origin, where the field H is zero, there is no strain. If the field H is increased to a value S or −S, the magnetostrictive element becomes saturated and further increase in the field (in either direction) does not produce any further strain. Curve B shows that the sensitivity of the device to the applied field increases linearly with increasing strength of the bias field H and thus the strength of the magnetism applied to the element 14 is chosen to provide a biasing field towards the upper end of the sensitivity curve. For example the fields represented by arrows 28 and 30 in FIG. 5 might have values H1 and −H1 as shown in FIG. 13.

Various arrangements for representing data are possible. For example, the different digits of a binary number might be represented by resonance at different harmonics. Thus, for example, the digits of a four bit binary number might be represented respectively by resonances at twice, three times, four times and eight times the natural frequency of the magnetostrictive element. The presence of a resonance might indicate binary 1 and absence binary 0. However, while this arrangement will be satisfactory for binary numbers having relatively few digits, signal to noise ratio will tend to decrease as the number of digits is increased if this coding arrangement is used. An alternative coding arrangement which would give numbers from 0 to 219 would be to record only three harmonics on each tag out of a maximum of 12 harmonics (with the fundamental frequency excluded as such frequency carries the highest risk of being excited accidentally). Thus, there are 220 possible combinations of 3 out of 12 harmonics. This coding system would almost equate to an eight bit binary number (which can give 256 combinations) but with a much higher signal to noise ratio and therefore much higher reliability than would be obtained if up to eight harmonics were to be recorded simultaneously on each tag. An advantage of this system is that if more or less than three resonances are detected at any given time, this suggests either that more than one tag is present or that there is a malfunction. Thus, the decoding apparatus used with this system of representing data may be programmed to generate an alarm in response to the detection of an incorrect number of resonances.

Remotely Readable Indicators & Meters

FIGS. 14 to 19 illustrate a remotely readable meter 101 in which the invention is embodied. As shown in FIG. 14, the meter comprises a conventional sensing mechanism 100 (not shown in detail) for example for sensing gas flow, and six dials 102, 104, 106, 108, 110 and 112 driven by the sensing mechanism through a conventional linkage which is not shown but is diagrammatically represented by broken lines 114. As can be seen in FIG. 14, each of the dials 102 to 112 is marked with the digits 0 to 9 around its face and a casing 116 positioned adjacent to each dial bears a mark 118 indicating the current value represented by the rotary position of the dial. As is conventional, the six dials represent respectively the digits of a six digit number.

Figure 15:
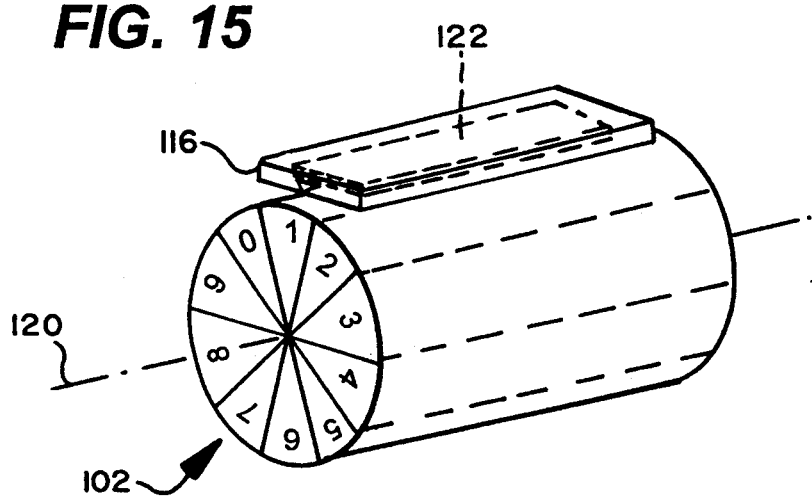
FIG. 15 is a perspective view of a dial of the meter of FIG. 14 showing more detail.

The dial 102 and casing 116 are shown in perspective in FIG. 15 and as can be seen the casing 116 is rectangular and is parallel to the rotary axis 120 of the dial and is substantially co-extensive with the axial length of the dial. The casing 116 contains a rectangular magnetostrictive strip element 122 which is similar to the element 12 of FIGS. 1 and 2 and is contained within a rectangular cavity inside casing 116 with clearance so that the element 122 may mechanically vibrate. The casing 116 is wholly made of a magnetically transparent material, such as a synthetic plastics material.

Figure 16:
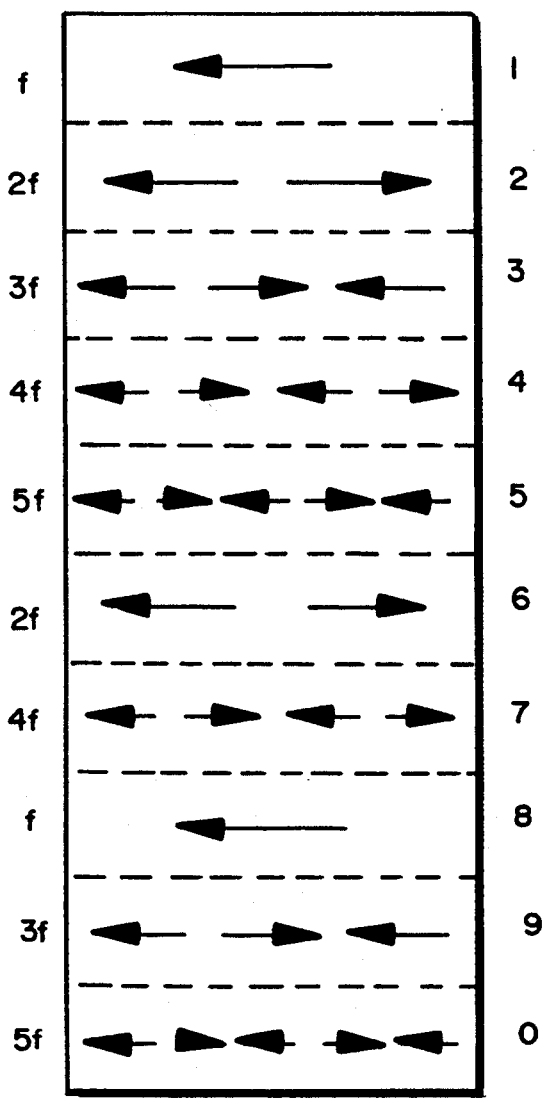
FIG. 16 illustrates by way of example, patterns of magnetisation which may be provided on the dials of FIG. 14 in accordance with an aspect of the invention.
Figure 17A:
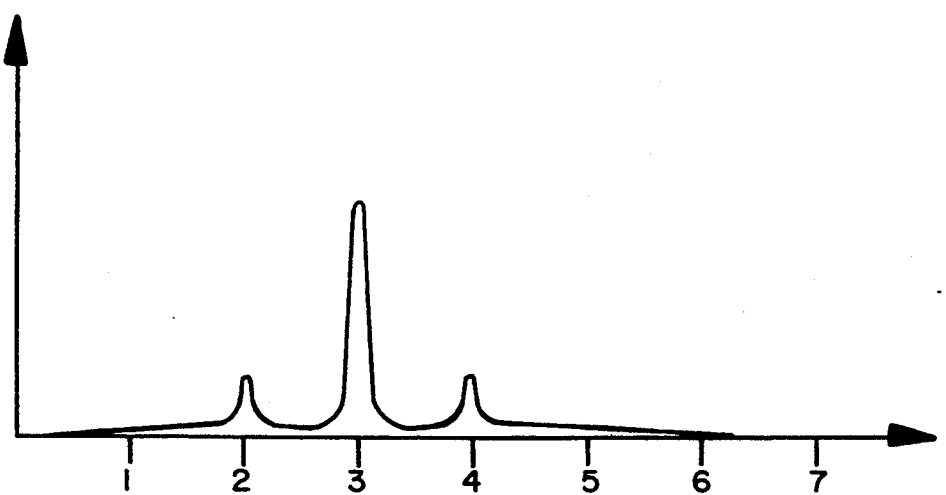
FIGS. 17A-17C illustrate graphically examples of responses which may be obtained from a given dial of FIG. 14 as the dial rotates to different successive positions.
Figure 17B:
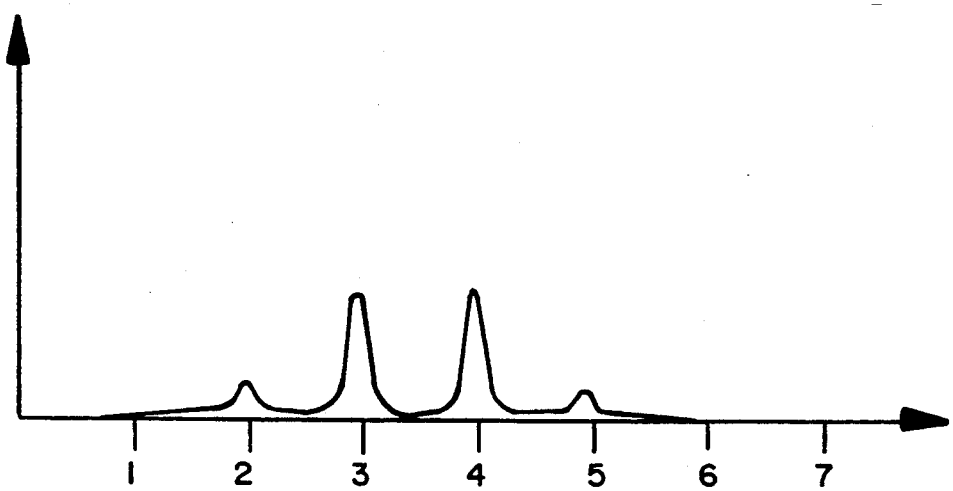
Figure 17C:
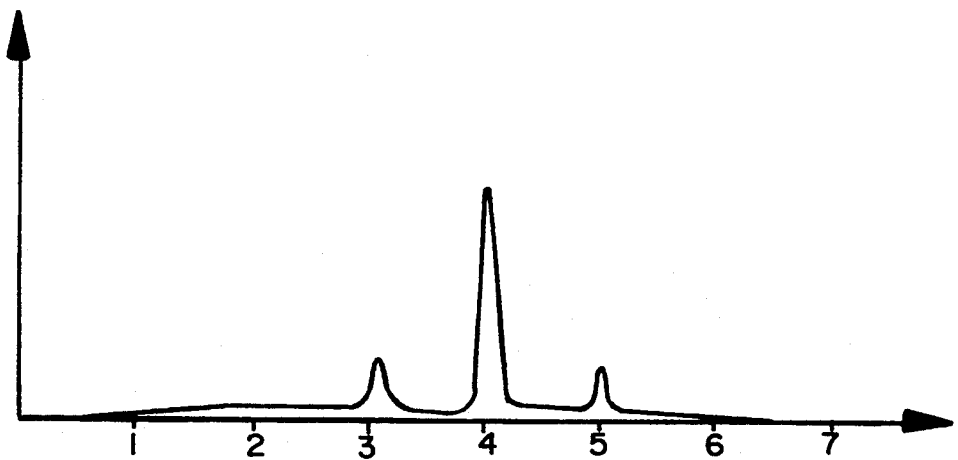

As is clear from FIGS. 14 and 15, each dial 102 to 112 is in the form of a drum. Strips 124 of hard magnetic material are attached to the periphery of the drum and extend longitudinally thereof. Each strip 124 is aligned with a corresponding number on the face of the dial and has recorded thereon a pattern of magnetism which is such that when a given strip is adjacent to the housing 116, the resulting magnetic field pattern will bias the strip such that it will resonate at a particular frequency. FIG. 16 illustrates examples of the magnetic field pattern which may be produced by the respective different strips 124. Thus, the strip 124 adjacent the number "1" on the dial produces a magnetic pattern which will cause the magnetostrictive element 122 to resonate at its fundamental or natural frequency f in response to an interrogating field having a frequency f. Similarly, the strips 124 adjacent the numbers 2 to 5 on the dial have magnetic patterns recorded in them which are such that the magnetostrictive element 122 will resonate at frequencies 2f to 5f in response to interrogating fields of frequencies 2f to 5f respectively. As shown in FIG. 16, the magnetic field patterns associated with the numbers 6 to 9 and 0 are also such as to produce resonance within the range f to 5f. However, as represented in FIG. 16, the width of the magnetostrictive element 122 is greater than the width of each strip 124 and thus the magnetostrictive element 122 is always influenced by either two or three of the strips 124. Thus, although the magnetostrictive element 122 is resonant at 4f both at dial position number 4 and dial position number 7, for example, it will when at position number 4 also resonate at 3f and 5f whereas when at position number 7 it will resonate also at 2f and f. In this way, position 4 and position 7 can be distinguished from each other. This is further illustrated in FIGS. 17A-17C which show the resonances produced as the dial moves from position 3 to position 4. Thus, curve A in FIG. 17 illustrates the resonances produced at position 3, these being 3f with high amplitude and 2f and 4f with relatively low amplitude. Curve B in FIG. 17B illustrates the resonances produced as the dial is approximately half way between positions 3 and 4, i.e. approximately equal amplitude resonances at 3f and 4f are produced whereas there are low amplitude resonances at 2f and 5f. Curve C in FIG. 17C illustrates the resonances produced when the dial is at position 4, namely high amplitude resonance at 4f and approximately equal but low amplitude resonances at 3f and 5f. As will now be clear, the coding arrangement for the digits shown on the dial is as follows:

| DIGIT | RESONANT FREQUENCIES |
|---|---|
| 0 | 3f, 5f, f |
| 1 | 5f, f, 2f |
| 2 | f, 2f, 3f |
| 3 | 2f, 3f, 4f |
| 4 | 3f, 4f, 5f |
| 5 | 4f, 5f, 2f |
| 6 | 5f, 2f, 4f |
| 7 | 2f, 4f, f |
| 8 | 4f, f, 3f |
| 9 | f, 3f, 5f |

In the above table f is the natural frequency of the magnetostrictive strip. This type of coding arrangement has the advantage that the number of frequencies used at each dial is minimized.

Figure 18:
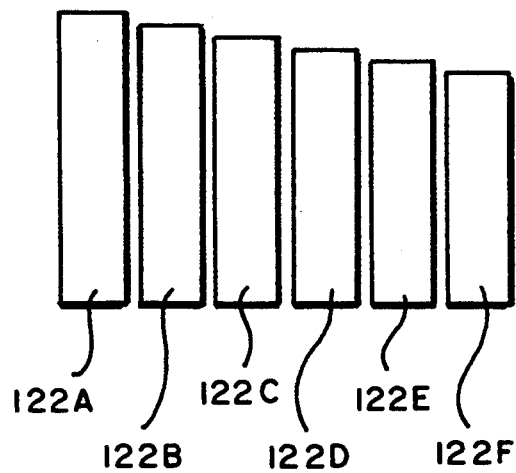
FIG. 18 illustrates the size relationship between respective different resonant strips associated with respective different ones of the dials in the meter of FIG. 14.

Thus, to interrogate the dials, an interrogating alternating magnetic field is applied and the frequency thereof is swept through the required range of frequencies. So that one dial can be distinguished from another, the lengths of the magnetostrictive strips adjacent the respective different dials are different as illustrated in FIG. 18. Thus, strips 122A to 122F correspond respectively to dials 102 to 112 and each has a different fundamental frequency and therefore a different set of harmonics.

Figure 19:
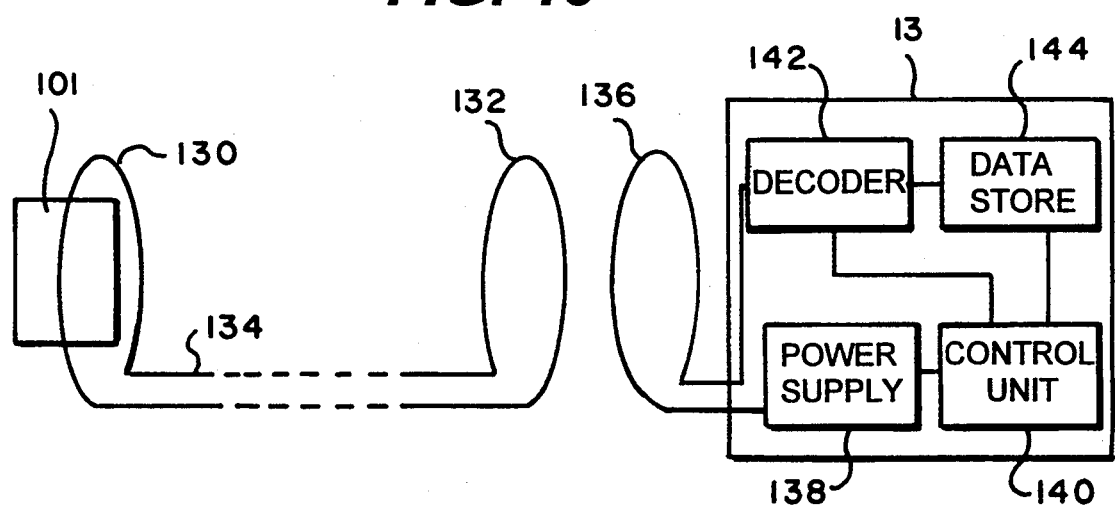
FIG. 19 is a diagram illustrating an arrangement for remotely reading the meter of FIGS. 14 to 18.

FIG. 19 shows an interrogation arrangement for the meter 101. This comprises a first coil 130 positioned adjacent the meter, a second coil 132 remote from the meter but connected to the coil 130 by simple electrical conductors 134 and a portable reading device 13, which may be carried by the person whose job it is to read the meter. Device 13 comprises a transmitting and receiving coil 136, a power supply 138 therefor, a control unit 140 for driving the power supply to cause the coil 136 to produce an alternating magnetic field whose frequency is swept or stepped through the range of frequencies (including the harmonics) at which the magnetostrictive elements 122 may resonate, a decoder 142 for decoding the detected regenerated fields and a data store 144 into which data read from each meter is stored, together with the identity of the meter, under control of the control unit 140.

Figure 20:
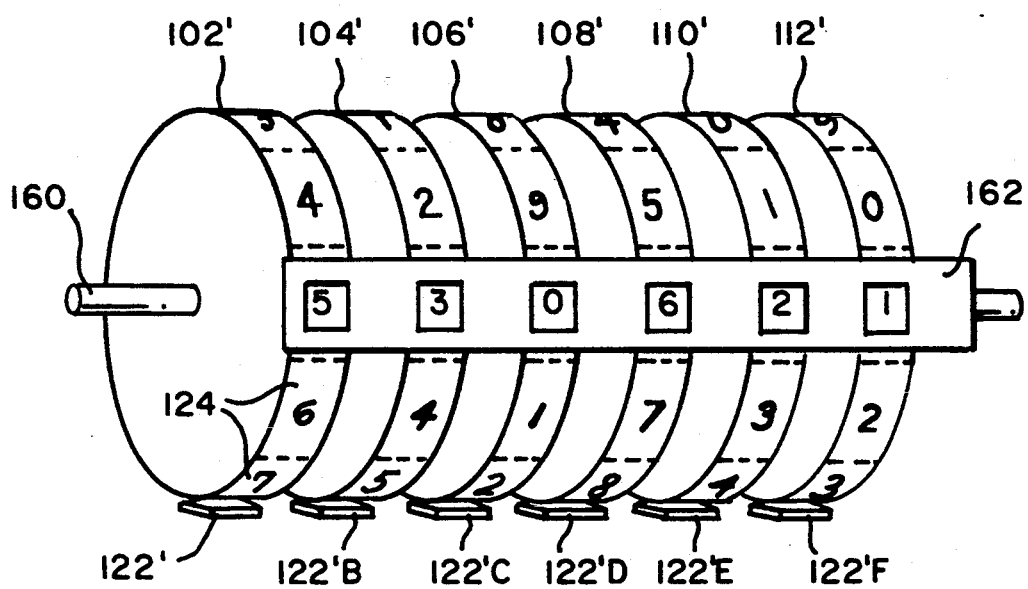
FIG. 20 is a diagrammatic perspective showing an alternative form of dial arrangement.
Figure 21:
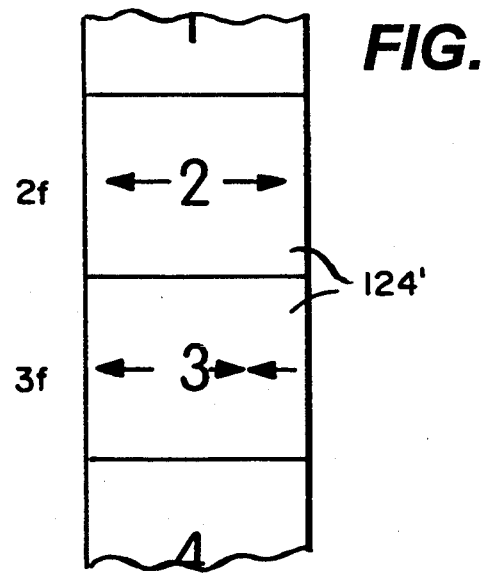
FIG. 21 diagrammatically illustrates part of the patterns of magnetisation provided on the dials of FIG. 20.

FIG. 20 shows a modified meter arrangement. In this embodiment the dials 102' to 112' are mounted on a common axle 160 and the dial numbers are on the periphery rather than on the end face and visible through an apertured window plate 162. The numbers on the dial face are marked on hard magnetic strips 124 which, as shown in FIG. 21, have recorded thereon magnetic patterns similar to those shown in FIG. 16. Magnetostrictive resonator elements 122'A to 122'F are located adjacent the peripheries of the dials, in a similar manner to the embodiment shown with respect to FIG. 14, in which the magnetostrictive resonator elements are contained in the casings 116. However, in this case, the axial lengths of the dials and thus the lengths of the magnetostrictive strips and of the hard magnetic strips are shorter than in FIG. 14.

Figure 22:
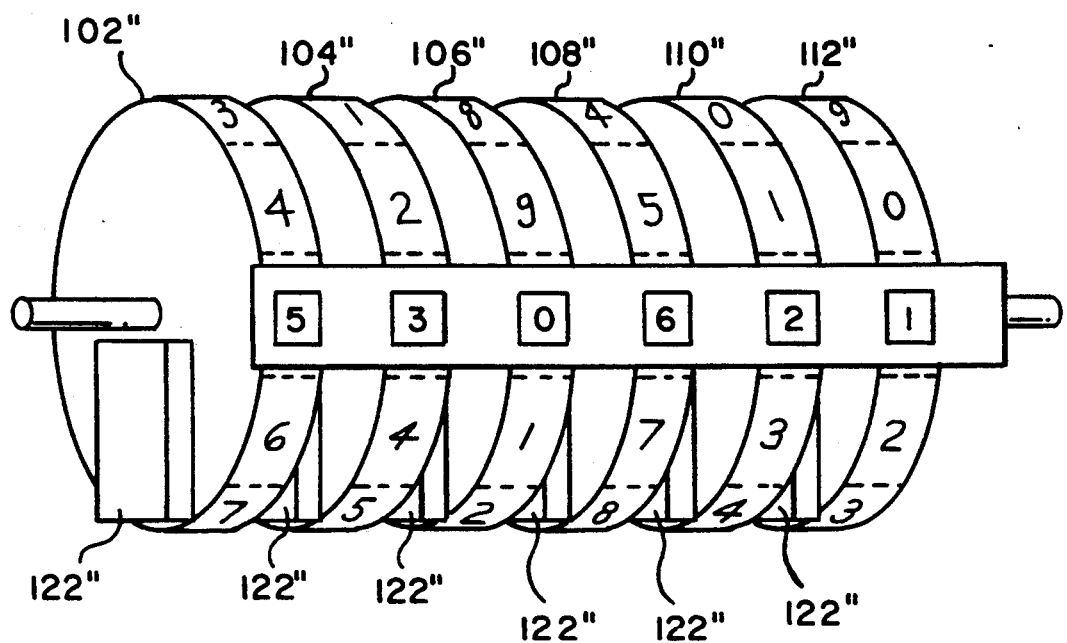
FIGS. 22 and 23 are similar to FIGS. 20 and 21, but showing a further alternative dial arrangement.
Figure 23:
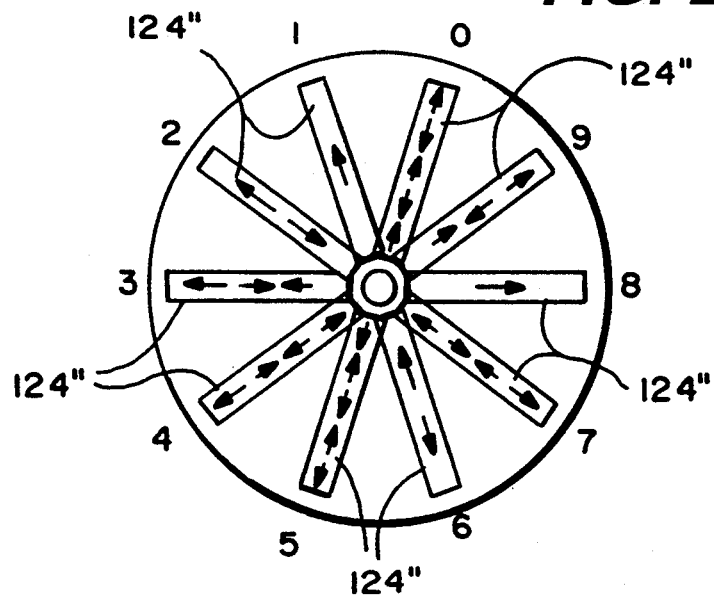

The embodiment of FIG. 22 and 23 is similar to that of FIGS. 20 and 21 except that hard magnetic strips 124" are provided on the side faces of the dials instead of their peripheries as shown best in FIG. 23, and the magnetostrictive resonators 122" are positioned adjacent the side faces as shown in FIG. 22. The resonators 122" and strips 124" extend radially in FIGS. 22 and 23.

Figure 24:
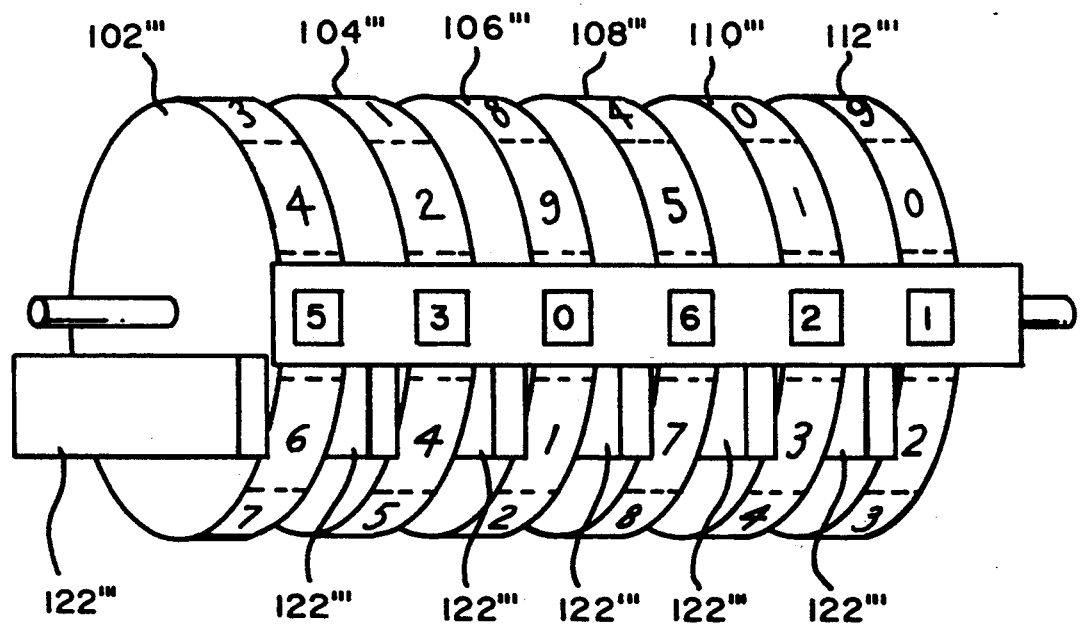
FIGS. 24 and 25 are also similar to FIGS. 20 and 21 and showing a yet further alternative arrangement of dials.
Figure 25:
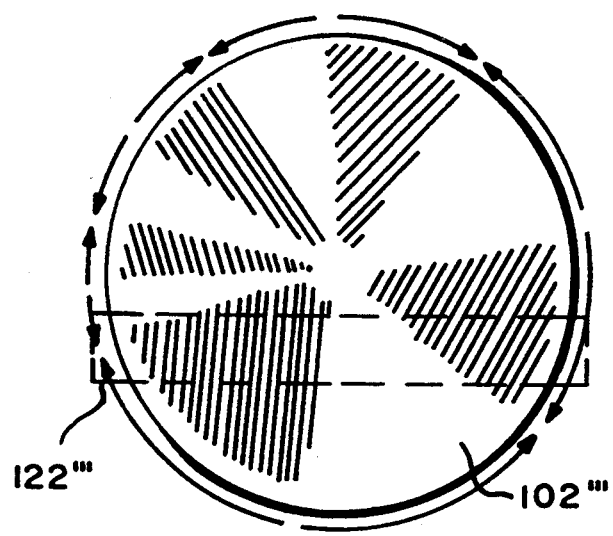

In FIGS. 24 and 25, the arrangement is similar to that shown in FIGS. 22 and 23 but the magnetostrictive strip elements 122''' extend along a chord of the side faces of the dials 102''' to 112''' and a hard magnetic disc is provided on the side face of each dial and magnetic patterns are recorded thereon as shown in FIG. 25. In that Figure, shaded areas indicate that the direction of the field is clockwise and unshaded areas indicate that the direction of the field is anticlockwise. Thus, it will be readily appreciated that the adjacent strips 122''' may be biased to resonate at selected frequencies as in the previous embodiments.

FIG. 26 illustrates a modification to the meter arrangement of FIG. 14 for increased accuracy. The arrangement of FIG. 26 is the same as that of FIG. 14 except that each dial has associated therewith an additional magnetostrictive resonator 123 contained in a casing 117. The arrangement of the resonators 122 and 123 relative to the dial 102 is such that when one of the numbers on the dial, and therefore one of the strips 124 is aligned with one of the resonators, the other resonator is approximately half way between two of the adjacent strips 124. So that the resonances from the two strips 122 and 123 can be distinguished from each other, they are preferably of different lengths. By appropriate decoding of the signals regenerated by the two strips, accurate determination of the position of the dial can be made. Although FIG. 26 only shows a single dial, the same arrangement can be provided on each of the other dials in the meter with of course different frequencies for the different strips.

In the embodiments so far described, the magnetostrictive resonators have all been of rectangular form. They can, however, be of different shapes and FIGS. 27A-27C show an example in which the magnetostrictive strips are circular. Diagram A in FIG. 27A illustrates the biasing fields which would be produced by an adjacent hard magnetic disc element for causing the circular magnetostrictive element 80 to resonate at its fundamental frequency. Diagram B in FIG. 27B shows the magnetic field patterns for resonance at the first harmonic which would be, in this case, approximately twice but not precisely twice the fundamental. Diagram C in FIG. 27C shows the magnetic field patterns for biasing the disc 80 to resonate at its second harmonic which would be approximately but not exactly three times the fundamental frequency. These field patterns may De produced by recording signals along the diameter of an adjacent hard magnetic disc (not shown) in the manner described with reference to FIGS. 3 to 9.

Figure 28:
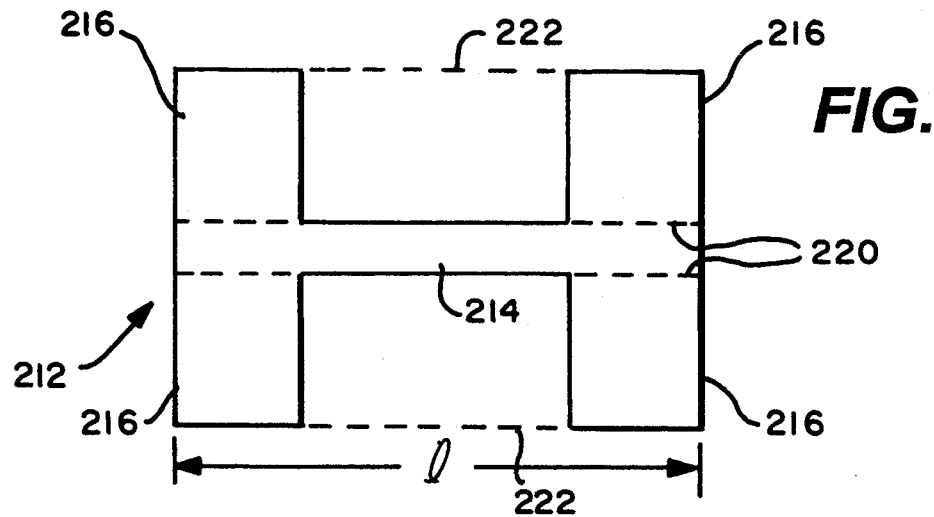
FIGS. 28 to 30 are diagrams showing further possible shapes for the magnetostrictive resonant element employed in the present invention.

FIG. 28 illustrates a magnetostrictive element 212 which may be utilized in a variety of embodiments of the invention. The element 212, which may be stamped or etched from a sheet of magnetostrictive material, comprises a strip 214 of length 1 with four side projections 216 adjacent its ends. The effect of the projections 216 is to reduce the natural frequency that the strip 214 of length 1 would otherwise have. This reduction in natural frequency arises from the addition to the strip 214 of the mass associated with the extensions 216. Thus, for a given required natural frequency, the dimension 1 may be reduced. As in the previously described embodiments, a hard magnetic biasing member having an appropriate magnetic pattern recorded thereon will be associated with the element 212. The size and shape of the hard magnetic biasing member may, for example, be the same as the strip 214 as indicated by dotted lines 220 in FIG. 28 or, as an alternative, might be a rectangle whose size is equal to the outline shape of the element 212 as indicated by dotted lines 222 in FIG. 28. As a further alternative, the size of the hard magnetic biasing member might be intermediate the sizes indicated by lines 220 and 222. Particularly in the case where the magnetic biasing member has a size indicated by the dotted lines 222 (or is large relative to the strip 214), magnetic patterns may be recorded on the hard magnetic member so as to cause vibration of the projections 216 in selected directions, such as a direction transverse to the element 214, in response to an interrogating field of appropriate frequency. Thus, with the arrangement shown in FIG. 28, vibrations in various directions at various selected frequencies may be achieved. The vibrations in the projections 216 need not be harmonically related to the vibrations in the strip 214.

The element of FIG. 28 may be used in a manner described with reference to FIGS. 1 to 12 or, alternatively, in encoders, for example of the kind described with reference to FIGS. 14 to 25.

Figure 29:
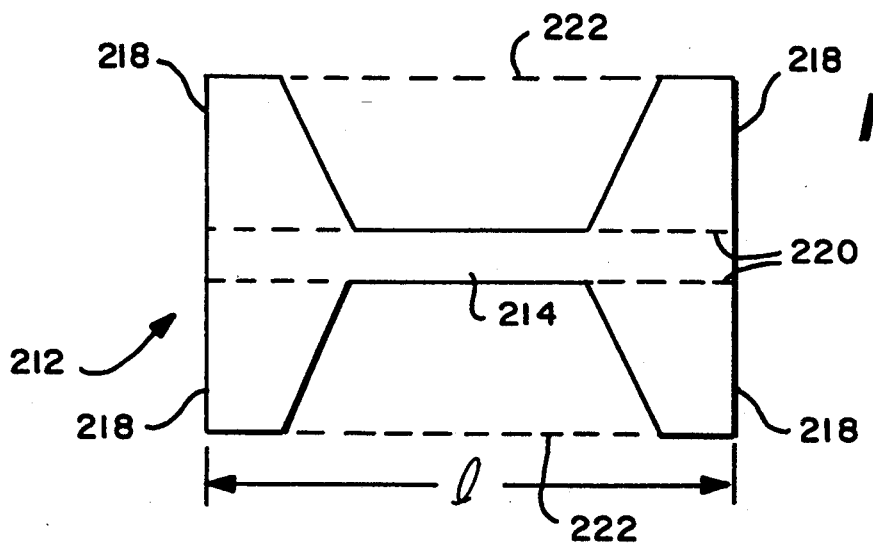

FIG. 29 shows a magnetostrictive element 212 similar to that shown in FIG. 28 except that, instead of rectangular projections 216, projections 218 of trapezoidal shape are shown. Thus, if the area of the projections 218 is less than that of the projections 216 but the elements shown in FIGS. 28 and 29 are otherwise the same, the natural or fundamental frequency of strip 214 of FIG. 29 will be somewhat higher than that of strip 214 of FIG. 28 due to the lower mass of projections 218 compared to projections 216. A hard magnetic biasing member as described with reference to FIG. 28 may be used with the element 212 shown in FIG. 29 and thus the same reference numbers in FIG. 29 designate items which correspond to those described with reference FIG. 28.

Figure 30:
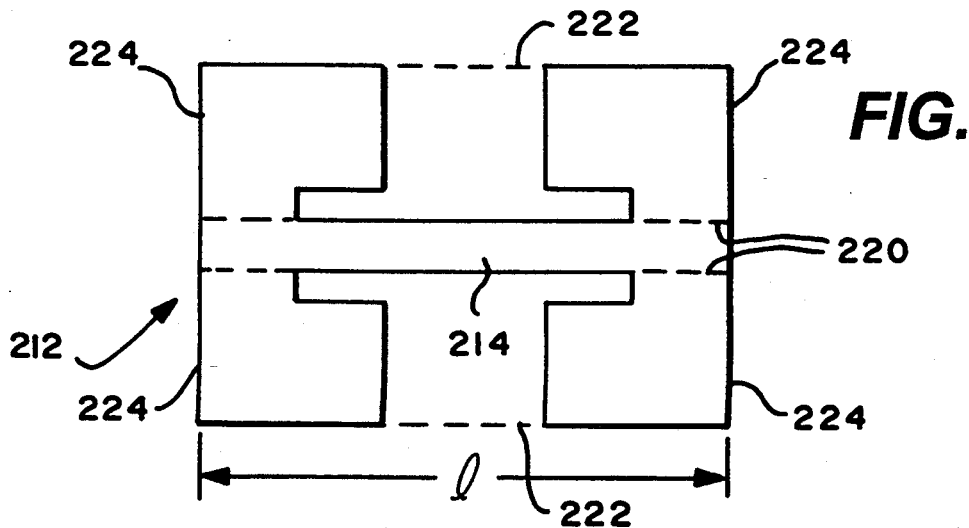

FIG. 30 shows a further modified magnetostrictive element 212 similar to that described with reference to FIGS. 28 and 29 and accordingly corresponding reference numbers are used to indicate corresponding items. In FIG. 30 lateral projections 224 are provided on the strip 214 instead of the projections 216 and 218 of FIGS. 28 and 29. Each projection 224 is of generally L-shape and the projections thus form E-shapes with the strip 214. Apart from the shape of the projections 224, the description given with reference to FIGS. 28 and 29 also applies to FIG. 30. As a specific example of frequencies obtainable with a device as shown in FIG. 30, 1 might have a value of 5 mm which, in the absence of the projections 224, would mean that the strip 214 would have a fundamental frequency of 440 KHz. The mass of the elements 224 might be such as to reduce this frequency to a lower value of say 113 KHz and, in an experimental set up, it has been found that a hard magnetic element having a width slightly greater than that indicated by dotted lines 220 and producing a biasing field to induce resonance of the strip 214 at its fundamental frequency will produce an additional unwanted resonance at a higher frequency (in the experiment this was found to be 223 KHz), in response, of course, to an interrogating field of the relevant frequencies. This unwanted frequency will be taken into account in designing any practical system.

Thus, with the shaped magnetostrictive elements 212 biased by a simple unidirectional biasing field, different portions of the elements 212 may be caused to resonante at respective different frequencies in response to biasing fields of the same frequencies.

Figure 31:
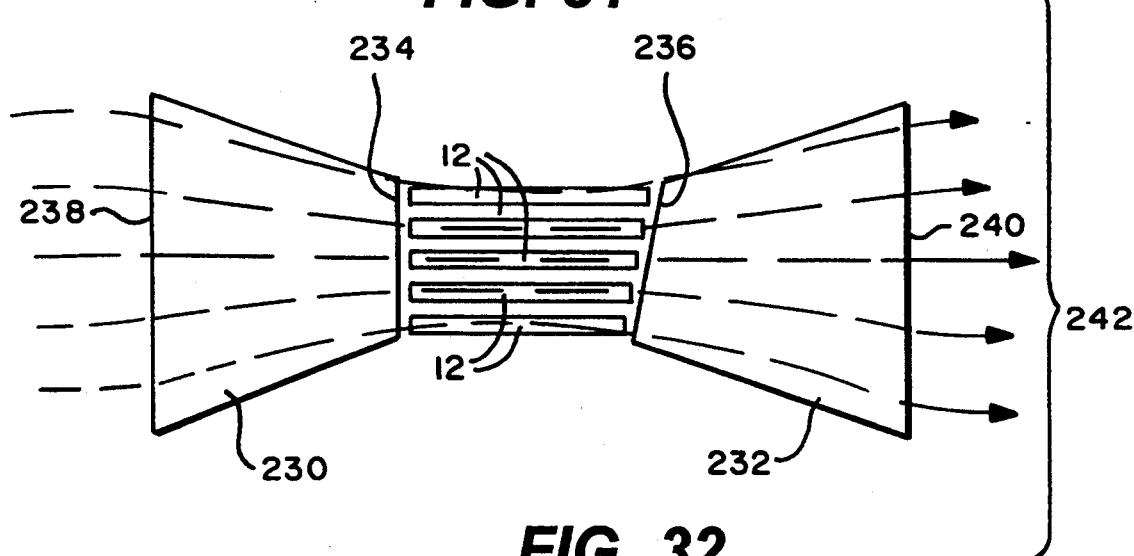
FIG. 31 is a diagrammatic plan view illustrating a modification whereby the response of the magnetostrictive resonant elements to an interrogating field may be enhanced.
Figure 32:
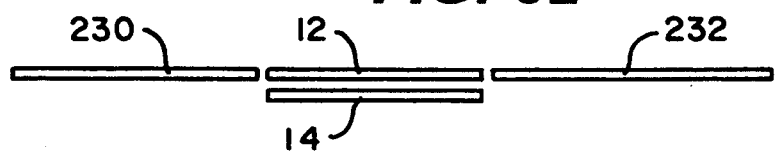
FIG. 32 is a diagrammatic side view of the modification of FIG. 31.

With reference to FIGS. 31 and 32, a set of five magnetostrictive resonator elements 12 each having an associated hard magnetic biasing element 14 as described with reference to FIGS. 1 to 9 is positioned between planar soft magnetic sheets of high permiability 230 and 232 of trapezoidal shape. As can be seen in FIG. 32, the sheets 230 and 232 are in the same plane as the elements 12. The narrow ends 234 and 236 of the sheets 230 and 232 respectively are positioned adjacent the ends of the elements 12 and the wide ends 238 and 240 of the sheets 230 and 232 respectively are accordingly spaced from the elements 12. As seen in FIG. 31, the sheets 230 and 232 are of different shape from each other so that the edges which are adjacent the ends of the elements 12 are located as closely as possible thereto. The effect of this arrangement is to concentrate the magnetic flux of the interrogating field in the region between the narrow ends 234 and 236 of the sheets 230 and 232 that is to say in the region containing the magnetostrictive elements 12. This effect is shown by dotted lines 242 in FIG. 31, representing the flux lines of the interrogating field. As a result of this, the sensitivity of the magnetostrictive elements to the applied field is increased. Thus, where the arrangement of FIGS. 31 and 32 is applied to a tag in a system as described with reference to FIG. 10 or 12, for example, the range of operation is increased for a given power level. Alternatively, this arrangement will allow lower power levels to be used for the interrogating field if the range is maintained or, as a further alternative, if both range and power levels are maintained, enhanced signal to noise ratio will be achieved.

A suitable magnetic material for the sheets 230 and 232 is Vacuumschmelze 6025.

Figure 33:
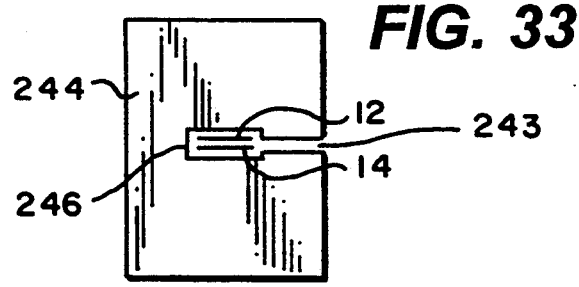
FIG. 33 is a diagrammatic plan view showing a further modification whereby the response of the magnetostrictive resonant element to an interrogating field may be enhanced.
Figure 34:
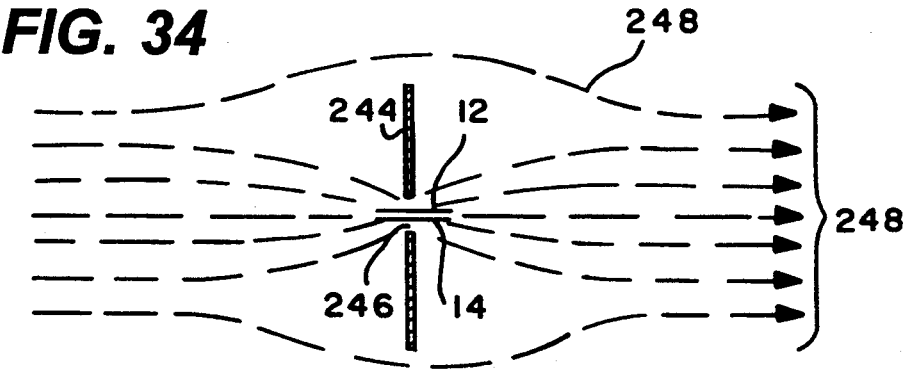
FIG. 34 is a diagrammatic side view of the modification of FIG. 33.

FIGS. 33 and 34 show an alternative arrangement for concentrating the flux of the interrogating field in the region containing the magnetostrictive element 12. In FIGS. 33 and 34, a rectangular sheet 244 of non-magnetic material, such as aluminium, has an aperture 246 in which the element or elements 12 and 14 are located, with the sheet 244 extending generally perpendicularly to the elements 12 and 14 and positioned at about the center thereof. A narrow gap 243 extending from the aperture 246 to the edge of the member 244 ensures that there is no short circuit path extending all the way around the gap 246. As represented by broken lines 248 in FIG. 34, the lines of flux of the interrogating magnetic field pass around the sheet 244 and through the aperture 246 therein, those passing through the aperture 246 thus being concentrated in the manner shown and thus enhancing the strength of the interrogating field in the region of the opening 246 where the magnetostrictive element 12 is located. To be effective, the sheet 244 should have a thickness at least as great as the electromagnetic skin depth. Optimally, therefore, the thickness is slightly greater than this depth so as to achieve the required result without wasting material.

With reference to FIG. 35, a magnetostrictive element 312 is biased by a hard magnetic biasing element (not shown) in such a manner that the fields in the upper and lower parts of the strip element 312 are directed in opposite longitudinal directions as shown by arrows 314 and 316. FIG. 36 shows at Aa and Ab respectively the signals recorded on the biasing element along lines a—a and b—b indicated in FIG. 35. The effect of this magnetic pattern is that, in response to an interrogating field of appropriate frequency, the upper and lower portions of the strip 312 as shown in FIG. 35 will extend and contract in anti-phase to each other producing flexural vibrations of the strip in its own plane as shown in chain dotted lines in FIG. 37. The frequency at which these oscillations occur will differ from the fundamental frequency of the element 312. In order to produce other vibrational modes at other frequencies, other signal patterns may in practice be superimposed on those shown on FIG. 36, for example for causing the element 312 to vibrate longitudinally at harmonics of its fundamental frequency in the manner described with reference to FIGS. 4 to 9.

In the embodiment of FIG. 38, a magnetostrictive strip element 412 is biased by a hard magnetic element (not shown) producing a field transverse to the length of the strip as shown by arrows 416. The strength of the field represented by arrows 416 is greatest at the ends of the strip and decreases towards the center of the strip at which region the field is substantially zero. Thus, FIGS. 39A–39C illustrate at Ba, Bb and Bc the signals recorded on the magnetic biasing element along the lines aa, bb and cc respectively as marked on FIG. 38. It should be understood that the horizontal axis in the graphs of FIGS. 39A–39C represent the signal recorded in a direction transverse to rather than longitudinally of the strip 416. The effect of this magnetic field pattern is to produce transverse vibrational distortion of the strip in a manner somewhat as shown in FIG. 40 where, essentially, the ends of the strip are splayed transversely in response to a interrogating alternating field of appropriate frequency. As will be seen in FIG. 40, there is some apparent contraction in the width of the strip in the intermediate zones bb and cc. This has been predicted by a computer simulation of the vibration that would be produced by the patterns shown in FIGS. 38 and 29. The frequency of the signal necessary to produce the oscillations shown in FIG. 40 will be different from the fundamental frequency of the strip. As with the other embodiments, other field patterns may be superimposed on those shown in FIGS. 38 and 39 so as to arm the strip for resonance at other frequencies, such as its fundamental frequency and/or harmonics thereof.

Thus, the embodiments of FIGS. 35 to 40 are illustrative of the principle that, in accordance with the invention, vibration in different modes may be induced in the strip to provide additional frequencies to which the strip will respond.

Various modifications are possible within the scope of the invention. For example, instead of the arrangement shown in FIG. 19, meter reading could be achieved by placing the reading device close to the meter. However, the provision of the coils 130 and 132 as shown in FIG. 19 makes it possible, for example, for the meter to be located inside a house and reading to take place from a few meters away from the house.

Although, in FIGS. 14 to 25, magnetic patterns are provided on each dial to cause the associated single magnetostrictive strip to resonate at different frequencies according to dial position, it would be possible to reverse the arrangement. Thus, a single magnetic biasing member could be positioned next to the dial and, instead of the magnetic patterns on the dial, magnetostrictive elements could be mounted on the dial at positions corresponding to the numbers thereof so as to be biased to resonate at their natural frequencies when positioned next to the biasing element. Magnetostrictive strips having different natural frequencies would be associated with the different numbers so that the numbers can be distinguished from each other. Further, although the dials have been shown as rotary, it is possible with the invention to detect linear and other movements. It would also be possible to construct a device in accordance with the invention for indicating the value of a variable without any moving parts. Electrical means could be provided for producing different magnetic patterns as by energizing a set of electromagnetic coils as a function of the value of the variable and a magnetostrictive element or elements biased by said magnetic pattern could be arranged to resonate at different frequencies according to the magnetic biasing pattern produced. Thus, the different frequencies or combinations of frequencies would be indicative of the value of the variable.

Although the members 124 in the embodiment of FIG. 14 have been described as separate hard magnetic strips, it would alternatively be possible to provide a single hard magnetic coating on the surface of each drum so that the "strips" would not be physically separate but would merely be zones with differing magnetic patterns recorded in them. This also applies to the elements 124' and 124" of the other embodiments.

Although as described with reference to FIGS. 1 and 2, an advantage of the tag of the invention is that it is readily programmable, there may be some applications where this is undesirable. To provide security against reprogramming after a tag has been made, the tag could be mounted inside a thick casing such that it would be difficult to bring a recording head into close enough proximity to the hard magnetic element 14 to affect the previously recorded pattern therein.

As a further modification, it would be possible to provide two or more magnetostrictive strips of different lengths in the same tag for increasing bit density. Each such element would preferably be programmed to resonate at at least two frequencies.

Although the remote reading arrangement involving a "slave" coil illustrated as 130, 132, 134 in FIG. 19 has only been shown in relation to the remote reading of the meter 101 of FIG. 14, such an arrangement with a slave coil could also be used for interrogation of the tags described with reference to FIGS. 1 and 2.

Although in the description with reference to the drawings, the magnetostrictive strips have been biased in only one direction, i.e. along their length, it would also be possible to bias them transversely by appropriate field patterns so that they will be caused to resonate in the transverse direction instead of or in addition to resonance in the longitudinal direction.

Although it is preferred that the magnetic pattern in the hard magnetic material be recorded as a sine wave or a combination of sine Waves, it would alternatively be possible to use other waveforms. A sine wave is preferred however since it substantially avoids unwanted resonances at other harmonics. For example, if a square wave were used, a lower signal to noise ratio would result since (as will be apparent from Fourier analysis) resonances will arise not only at the required frequency but also at undesired frequencies.

Although in the embodiment of FIG. 1, the biasing element 14 has been shown as separate from the magnetostrictive strip 12, the two elements could be formed as one. For example, a strip of magnetostrictive material could be coated with hard magnetic material.

Although, in the above description, there have been various references to causing the interrogating field to be swept or stepped through the required range of frequencies, other alternatives are possible. For example, the interrogating field could comprise a burst of the required interrogating frequencies generated simultaneously or, in some situations, could be in the form of a burst of noise, such as white noise, containing a large number of frequencies in addition to those required for causing resonance.

It has been described with reference to FIGS. 28 to 30 that the provision of projections at the ends of the strip reduces the fundamental frequency of the strip. Alternative ways of reducing fundamental frequency are possible, in particular by adding mass in some other way such as by depositing massy material at appropriate positions.

Although in various embodiments, particularly those described with reference to FIGS. 28 to 30 and 35 to 40, it has been indicated that the magnetostrictive element may be biased to resonate in different modes or directions, in many applications it will be desired to ensure that resonance in only the longitudinal mode is achieved. In such applications, a simple rectangular strip of magnetostrictive material may be used with a high aspect ratio i.e. the strip is long and thin so that longitudinal vibration is maximized and transverse vibration minimized. For a constant length of strip, reducing the width reduces the total signal because the amount of material is reduced but improves the signal to noise ratio because the resonance produced has a substantially narrower frequency band. If the length of the resonator is an integer multiple of its width then difficulties may arise in using certain harmonics. For example, in experimentation with devices having a 3:1 aspect ratio, the third harmonic (i.e. a frequency three times the fundamental) was not usable because it was split into a doublet. A similar effect occurred at the ninth harmonic with this arrangement. Further, the resonant frequencies were not exact multiples of the fundamental where low aspect ratio is used and this is believed to be due to the excitation of resonances transverse to the strip. These problems may be avoided by using high aspect ratio strips, for example an aspect ratio of 15:1 or more, since the problems under discussion will then only arise at very high harmonics (frequencies of 15 times the fundamental or higher where the aspect ratio is 15:1), which would be outside the range of frequencies used.

It has been described above with reference to FIGS. 3 to 9 that the signal source 20 is preferably turned on before the tag 2 reaches the transducer 18 and is turned off after the tag 2 has passed for the purpose of avoiding transients. In many situations, however, this will not be necessary since careful design of the system can avoid the occurrence of unwanted transients.

The invention may be applied to a variety of different systems in addition to identification tags and meter reading. For example, it may be used for goods labelling, inventory control, luggage sorting at airports, vending, manufacturing automation, security and access control, ticketing, credit cards and a wide variety of other applications, such as linear or rotary position encoders and other indicators such as compasses.

We claim:

1. A data storage device comprising:
a piece of magnetostrictive material, and
a magnetic bias field producing means for biasing said piece to resonate at a predetermined frequency in response to an applied interrogating alternating magnetic field at said predetermined frequency,
said magnetic bias field producing means producing a magnetic field pattern relative to said piece which causes resonance in said piece at a plurality of different predetermined natural frequencies in response to an applied interrogating alternating magnetic field at said predetermined frequencies.

2. A device according to claim 1 constructed as an identification device, said magnetic bias field producing means providing a field pattern encoded to provide identity to said device.

3. An identification system comprising at least one device according to claim 2, and further including:
means for producing an interrogation alternating magnetic field at said predetermined frequencies in an interrogation zone, and
means for detecting the presence of said device in said interrogating zone by electromagnetically detecting said resonance of said device at said predetermined frequencies.

4. A system according to claim 3 comprising:
a plurality of said devices encoded so that each said device is resonant at N said frequencies selected from M frequencies, where N is less than M,
said interrogation field producing means and said detecting means being operable at said M frequencies.

5. A system according to claim 3, wherein N is 3 and M is 12.

6. A system according to claim 3 wherein the pieces of magnetostrictive material in said devices are all the same as each other and wherein said M frequencies comprise multiples of the fundamental frequency of said pieces.

7. A system according to claim 2, wherein:
said M frequencies also comprise said fundamental frequency.

8. A device according to claim 1 wherein:
means is positioned in the region of the piece of magnetostrictive material for concentrating flux produced by the interrogating field in the region of said piece.

9. A device according to claim 8, wherein said flux concentrating means comprises:
first and second members of soft magnetic material of high permeability between which said piece of magnetostrictive material is positioned.

10. A device according to claim 8, wherein said means for concentrating flux comprises:
a member of non-magnetic material having an opening therein through which said piece of magnetostrictive material extends, said member of non-magnetic material being so formed that flux is concentrated in said aperture.

11. A device according to claim 1, wherein:
said piece is a rectangular strip of magnetostrictive material, and
said biasing field pattern comprises a plurality of components directed longitudinally of said strip, at least one of said components reversing in direction in successive segments of said strip of substantially equal length to provide resonance at a multiple of the fundamental frequency of the strip, according to the number of said segments.

12. A device according to claim 11, wherein there are two of said segments, thereby to produce resonance at twice the fundamental frequency.

13. A device according to claim 11, wherein there are three of said segments, thereby to produce resonance at three times the fundamental frequency.

14. A device according to claim 11, wherein there are four of said segments, thereby to produce resonance at four times the fundamental frequency.

15. A device according to claim 1, wherein said piece of magnetostrictive material comprises a rectangular strip of magnetostrictive material with lateral extensions at opposite ends thereof.

16. A device according to claim 15, wherein said lateral extensions are such that the piece is of generally H-shape.

17. A device according to claim 15, wherein the lateral extensions of said piece are of L-shape to form, with the strip, an E-shape configuration at each end of the strip.

18. A device according to claim 1, in which said bias field pattern causes at least one of said predetermined frequencies to be a multiple of the fundamental frequency of the piece.

19. A device according to claim 1, in which said bias field pattern causes said predetermined frequencies to comprise at least two multiples of the fundamental frequency of said piece.

20. A device according to claim 1, in which said bias field pattern causes said predetermined frequencies to comprise the fundamental frequency of said piece and at least one multiple thereof.

21. A device according to claim 1, in which:
said piece of magnetostrictive material is of elongate shape, and
said bias field pattern comprises at least two components, at least one of said components being directed longitudinally of said piece and the direction of said component reversing along said piece in successive segments thereof of substantially equal length so that said at least one component causes resonance at a multiple of the fundamental frequency of the piece.

22. A device according to claim 1, wherein said piece of magnetostrictive material comprises a rectangular strip of magnetostrictive material with mass added thereto for reducing the natural frequency thereof.

23. A device according to claim 1, wherein said bias field pattern comprises first and second components, one of which causes resonance of the piece of magnetostrictive material in a mode different from that caused by the other of said components.

24. A device according to claim 1, wherein:
said piece of magnetostrictive material is a rectangular strip of material, and
said bias field comprises a first component for causing longitudinal vibration thereof and a second component for causing flexural vibration thereof in the plane of the piece.

25. A device according to claim 1, wherein:
said piece of magnetostrictive material is a rectangular strip, and
said bias field pattern comprises at least two components, one of which causes longitudinal vibration of the strip and the other of which causes, in at least a portion of the strip, transverse stretching and contraction of the strip.

26. A device according to claim 1 wherein:
the bias field producing means includes hard magnetic material, a magnetic pattern being recorded on said hard magnetic material for producing said bias field pattern.

27. A method of making a data storage device according to claim 1, wherein:
said field pattern is recorded in a hard magnetic element by a process in which a recording device and the hard magnetic element are moved from an initial position in which they are not in register, through a position in which they are in register and recording takes place to a final position in which they are again not in register,
said recording being effected by applying to said recording device a signal having a smoothly crowed function, said signal being started in said initial position and terminated in said final position of said recording device and said hard magnetic element.

28. A device according to claim 1, wherein said piece of magnetostrictive material and said magnetic bias field producing means are formed in one piece.

29. A data storage device comprising:
a piece of magnetostrictive material, and
a magnetic field producing means, said magnetic field producing means being arranged for producing in said piece a field pattern for causing said piece to resonate at a predetermined frequency in response to an applied interrogating alternating field at said predetermined frequency, said field pattern having a strength which varies as a smoothly curved function over said piece.

30. A device according to claim 29, wherein said function is composed of one or more sine functions.

31. A device according to claim 30 wherein said function has zero crossing points that substantially coincide with the ends of said piece.

32. A data storage device according to claim 29 wherein,
said field pattern strength decreases progressively substantially to zero at the edges of said piece.

33. A data storage device comprising:
a piece of magnetostrictive material, and
a magnetic field producing means for producing in said piece a biasing field pattern which is such that said piece will resonate in a non-longitudinal mode in response to an applied interrogating magnetic field of a predetermined frequency.

34. A device according to claim 33, wherein said piece is a rectangular strip of magnetostrictive material and said non-longitudinal mode is a flexural mode in the plane of said strip.

35. A device according to claim 33, wherein said piece is a rectangular strip of magnetostrictive material and said non-longitudinal mode involves lateral stretching and contraction of said strip adjacent the ends with substantially no stress at a portion substantially midway between said ends.

36. A magnetically detectable magnetostrictive device which comprises:
a piece of magnetostrictive material adapted to respond to an interrogating alternating magnetic field, means for providing a magnetic bias field pattern relative to said piece, and
flux concentrating means separate from and adjacent to said piece, the flux concentrating means being shaped for concentrating the flux of the interrogating field in the region containing the piece.

37. A device according to claim 36, wherein said flux concentrating means comprises first and second members of soft magnetic material of high permeability between which said piece is located.

38. A device according to claim 37, wherein said flux concentrating means comprises a member of non-magnetic material having an aperture therein through which said piece extends, said member being constructed to cause concentration of said flux in said aperture.

39. A data storage device comprising:
a piece of magnetostrictive material, and
a magnetic field producing means, said magnetic field producing means being arranged for producing in said piece a field pattern such that said piece will resonate at a predetermined frequency higher than its natural frequency in response to an applied interrogating alternating field at said predetermined frequency.

* * * * *

UNITED STATES PATENT AND TRADEMARK OFFICE
CERTIFICATE OF CORRECTION

PATENT NO. : 5,420,569
DATED : May 30, 1995
INVENTOR(S) : Andrew N. DAMES & Peter J. HYDE

It is certified that error appears in the above-identified patent and that said letters patent is hereby corrected as shown below:

Column 17, line 10, change "claim 3" to --claim 4--.
Column 18, line 62, change "crowed" to --curved--.
Column 19, line 19, after "edges", insert --or ends--.
Column 20, line 18, change "claim 37" to --claim 36--.
Column 17, line 12, change "claim 3" to --claim 4--.
Column 17, line 17, change "claim 2" to --claim 4--.

Signed and Sealed this

Nineteenth Day of September, 1995

Attest:

BRUCE LEHMAN

*Attesting Officer*     *Commissioner of Patents and Trademarks*